US012651564B2

(12) United States Patent
Kwon et al.

(10) Patent No.: US 12,651,564 B2
(45) **Date of Patent: *Jun. 9, 2026**

(54) DISPLAY DEVICE AND DRIVING METHOD THEREOF

(71) Applicant: Samsung Display Co., Ltd., Yongin-si (KR)

(72) Inventors: Sangan Kwon, Cheonan-si (KR); Soon-Dong Kim, Osan-si (KR); Taehoon Kim, Hwaseong-si (KR); Eun Sil Yun, Hwaseong-si (KR); Changnoh Yoon, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 19/031,776

(22) Filed: Jan. 18, 2025

(65) Prior Publication Data

US 2025/0166561 A1 May 22, 2025

Related U.S. Application Data

(63) Continuation of application No. 17/719,797, filed on Apr. 13, 2022, now Pat. No. 12,217,665.

(30) Foreign Application Priority Data

Jul. 26, 2021 (KR) ........................ 10-2021-0097816

(51) Int. Cl.
*G09G 3/3208* (2016.01)

(52) U.S. Cl.
CPC ... *G09G 3/3208* (2013.01); *G09G 2300/0842* (2013.01); *G09G 2310/08* (2013.01); *G09G 2330/023* (2013.01)

(58) Field of Classification Search
None
See application file for complete search history.

(56) References Cited

U.S. PATENT DOCUMENTS

| | | | | |
|---|---|---|---|---|
| 12,217,665 | B2 * | 2/2025 | Kwon | G09G 3/035 |
| 2016/0042707 | A1 | 2/2016 | Wang et al. | |

(Continued)

FOREIGN PATENT DOCUMENTS

| | | | |
|---|---|---|---|
| KR | 100923347 | B1 | 10/2009 |
| KR | 1020190083393 | A | 7/2019 |

(Continued)

*Primary Examiner* — Benjamin C Lee
*Assistant Examiner* — Emily J Frank
(74) *Attorney, Agent, or Firm* — CANTOR COLBURN LLP

(57) ABSTRACT

A display device includes: a display panel including pixels, a data driving circuit, a scan driving circuit which drives a plurality of first scan lines and a plurality of second scan lines, and a driving controller which controls the data driving circuit and the scan driving circuit to drive a first display area of the display panel at a first operating frequency and drive a second display area of the display panel at a second operating frequency lower than the first operating frequency while an operating mode is a multi-frequency mode. During the multi-frequency mode, first scan signals provided to first scan lines, which correspond to the second display area, of the plurality of first scan lines are maintained at inactive levels in predetermined frames, and second scan signals provided to the plurality of second scan lines transition to active levels at least twice in each of the predetermined frames.

18 Claims, 16 Drawing Sheets

1 ≤ j ≤ 1920

(56) References Cited

U.S. PATENT DOCUMENTS

| | | | |
|---|---|---|---|
| 2017/0154598 | A1 | 6/2017 | Park et al. |
| 2017/0270882 | A1* | 9/2017 | Mori ..................... G06F 3/0412 |
| 2019/0206329 | A1 | 7/2019 | Lee et al. |
| 2020/0388228 | A1 | 12/2020 | Oh et al. |
| 2021/0005144 | A1 | 1/2021 | Long et al. |
| 2021/0118368 | A1 | 4/2021 | In et al. |
| 2021/0225227 | A1 | 7/2021 | Li et al. |
| 2021/0407383 | A1* | 12/2021 | Lai ....................... G09G 3/3233 |
| 2022/0335888 | A1 | 10/2022 | Song |
| 2023/0127696 | A1 | 4/2023 | Zheng et al. |
| 2023/0368730 | A1* | 11/2023 | Yamamoto ........... G09G 3/3233 |

FOREIGN PATENT DOCUMENTS

| | | | |
|---|---|---|---|
| KR | 1020200140152 | A | 12/2020 |
| KR | 1020210046910 | A | 4/2021 |

* cited by examiner

DISPLAY DEVICE AND DRIVING METHOD THEREOF

This application is a continuation of U.S. patent application Ser. No. 17/719,797, filed on Apr. 13, 2022, which claims priority to Korean Patent Application No. 10-2021-0097816, filed on Jul. 26, 2021, and all the benefits accruing therefrom under 35 U.S.C. § 119, the content of which in its entirety is herein incorporated by reference.

BACKGROUND

Embodiments of the present disclosure described herein relate to a display device.

An organic light emitting display device includes pixels connected to data lines and scan lines. Each of the pixels generally includes an organic light emitting diode, and a circuit unit for controlling the amount of current flowing to the organic light emitting diode. The circuit unit controls the amount of current flowing from a first driving voltage to a second driving voltage via the organic light emitting diode in response to a data signal. In this case, a light of luminance corresponding to the amount of current flowing through the organic light emitting diode is generated.

There is a lot of work going on to reduce power consumption of the display device.

SUMMARY

Embodiments of the present disclosure provide a display device capable of reducing power consumption and preventing display quality deterioration, and a driving method thereof.

According to an embodiment, a display device includes: a display panel including a plurality of pixels, each of which is connected to one of a plurality of data lines, one of a plurality of first scan lines, and ate least one of a plurality of second scan lines; a data driving circuit driving the plurality of data lines; a scan driving circuit driving the plurality of first scan lines and the plurality of second scan lines; and a driving controller controlling the data driving circuit and the scan driving circuit to drive a first display area of the display panel at a first operating frequency and driving a second display area of the display panel at a second operating frequency lower than the first operating frequency while an operating mode is a multi-frequency mode. During the multi-frequency mode, first scan signals provided to first scan lines, which correspond to the second display area, from among the plurality of first scan lines are maintained at an inactive level in predetermined frames, and second scan signals provided to the plurality of second scan lines transition to an active level at least twice in each of the predetermined frames.

In an embodiment, during the multi-frequency mode, first scan signals provided to first scan lines, which correspond to the first display area, from among the plurality of first scan lines may be activated sequentially in each of the predetermined frames.

In an embodiment, the multi-frequency mode may include a first frame and a second frame. The predetermined frames may include the second frame. During the first frame, first scan signals provided to the plurality of first scan lines may be activated sequentially. During the second frame, first scan signals provided to first scan lines, which correspond to the first display area, from among the plurality of first scan lines may be activated sequentially. During the second frame, the first scan signals provided to the first scan lines, which correspond to the second display area, from among the plurality of first scan lines may be maintained at inactive levels.

In an embodiment, the data driving circuit may provide data signals to the plurality of data lines, respectively, during the first frame of the multi-frequency mode.

In an embodiment, while the first scan signals corresponding to the first display area are activated sequentially during the second frame of the multi-frequency mode, the data driving circuit may provide data signals to pixels, which correspond to the first display area, among the plurality of pixels. While the first scan signals corresponding to the second display area are maintained at the inactive levels during the second frame of the multi-frequency mode, the data driving circuit may provide a bias voltage to pixels, which correspond to the second display area, among the plurality of pixels.

In an embodiment, each of the plurality of pixels may include: a first transistor including a first electrode, a second electrode, and a gate electrode; a capacitor connected between a first driving voltage line and the gate electrode of the first transistor; a light emitting diode including an anode electrically connected to the second electrode of the first transistor and a cathode connected to a second driving voltage line; a second transistor including a first electrode connected to a data line, a second electrode electrically connected to the first electrode of the first transistor, and a gate electrode connected to a corresponding second scan line among the plurality of second scan lines; and a third transistor including a first electrode connected to the second electrode of the first transistor, a second electrode connected to the gate electrode of the first transistor, and a gate electrode connected to a corresponding first scan line among the plurality of first scan lines.

In an embodiment, each of the first transistor and the second transistor may be a PMOS transistor. The third transistor may be an NMOS transistor.

In an embodiment, each of the plurality of pixels may be further connected to one of a plurality of third scan lines and one of a plurality of light emitting control lines. The scan driving circuit may drive the plurality of third scan lines. The display device may further include a light emitting driving circuit driving the plurality of light emitting control lines.

In an embodiment, each of the plurality of pixels may further include a fourth transistor including a first electrode connected to the gate electrode of the first transistor, a second electrode connected to a third driving voltage line, and a gate electrode connected to a corresponding third scan line among the plurality of third scan lines, a fifth transistor including a first electrode connected to the first driving voltage line, a second electrode connected to the first electrode of the first transistor, and a gate electrode connected to a corresponding light emitting control line among the plurality of light emitting control lines, and a sixth transistor including a first electrode connected to the second electrode of the first transistor, a second electrode connected to the anode of the light emitting diode, and a gate electrode connected to the corresponding light emitting control line among the plurality of light emitting control lines.

In an embodiment, a plurality of light emitting control signals provided to the plurality of light emitting control lines, respectively, may be activated sequentially. During the multi-frequency mode, a j-th ('j' is a positive integer) second scan signal of the second scan signals may transition to the active level at least two times before a j-th light emitting control signal of the light emitting control signals transitions from an inactive level to an active level and after a j-th first scan signal of the first scan signals transitions from an active level to the inactive level.

In an embodiment, during the multi-frequency mode, third scan signals provided to third scan lines, which correspond to the first display area, from among the plurality of third scan lines may be activated sequentially. During the multi-frequency mode, third scan signals provided to third scan lines, which correspond to the second display area, from among the plurality of third scan lines may be maintained at an inactive level.

In an embodiment, while the operating mode is a single frequency mode, the driving controller may control the data driving circuit and the scan driving circuit to drive the first display area and the second display area at a normal frequency.

In an embodiment, the first operating frequency may be higher than or equal to the normal frequency. The second operating frequency may be lower than the normal frequency.

According to an embodiment, a method for driving a display device including a first display area and a second display area includes: maintaining first scan signals provided to first scan lines, which correspond to the second display area, from among a plurality of first scan lines at an inactive level during predetermined frames in a multi-frequency mode, sequentially toggling second scan signals provided to a plurality of second scan lines ‘k’ times (‘k’ is a positive integer) during the multi-frequency mode, and changing a toggling count of each of the second scan signals into ‘x’ times ('x' is a positive integer greater than ‘k’) based on determination that duration of the multi-frequency mode is greater than or equal to a first reference time.

In an embodiment, the driving method may further include: changing the toggling count of each of the second scan signals into ‘y’ times ('y' is a positive integer greater than ‘x’) based on determination that the duration of the multi-frequency mode is greater than or equal to a second reference time. The second reference time may be greater than the first reference time.

In an embodiment, the driving method may further include changing an operating mode into a single frequency mode based on determination that the duration of the multi-frequency mode is greater than or equal to a third reference time. The third reference time may be greater than the second reference time.

In an embodiment, the driving method may further include sequentially driving the first scan signals provided to the plurality of first scan lines to be at an active level while the operating mode is the single frequency mode.

In an embodiment, the driving method may further include sequentially activating first scan signals provided to first scan lines, which correspond to the first display area, from among the plurality of first scan lines during the predetermined frames in the multi-frequency mode.

In an embodiment, the driving method may further include providing data signals to pixels, which correspond to the first display area while the first scan lines, which correspond to the first display area, from among the plurality of first scan lines are sequentially activated.

In an embodiment, the driving method may further include providing a bias voltage to pixels, which correspond to the second display area while the first scan lines, which correspond to the second display area, from among the plurality of first scan lines are maintained at the inactive level.

BRIEF DESCRIPTION OF THE FIGURES

The above and other aspects and features of the present disclosure will become apparent by describing in detail embodiments thereof with reference to the accompanying drawings.

DETAILED DESCRIPTION

Figure 1:
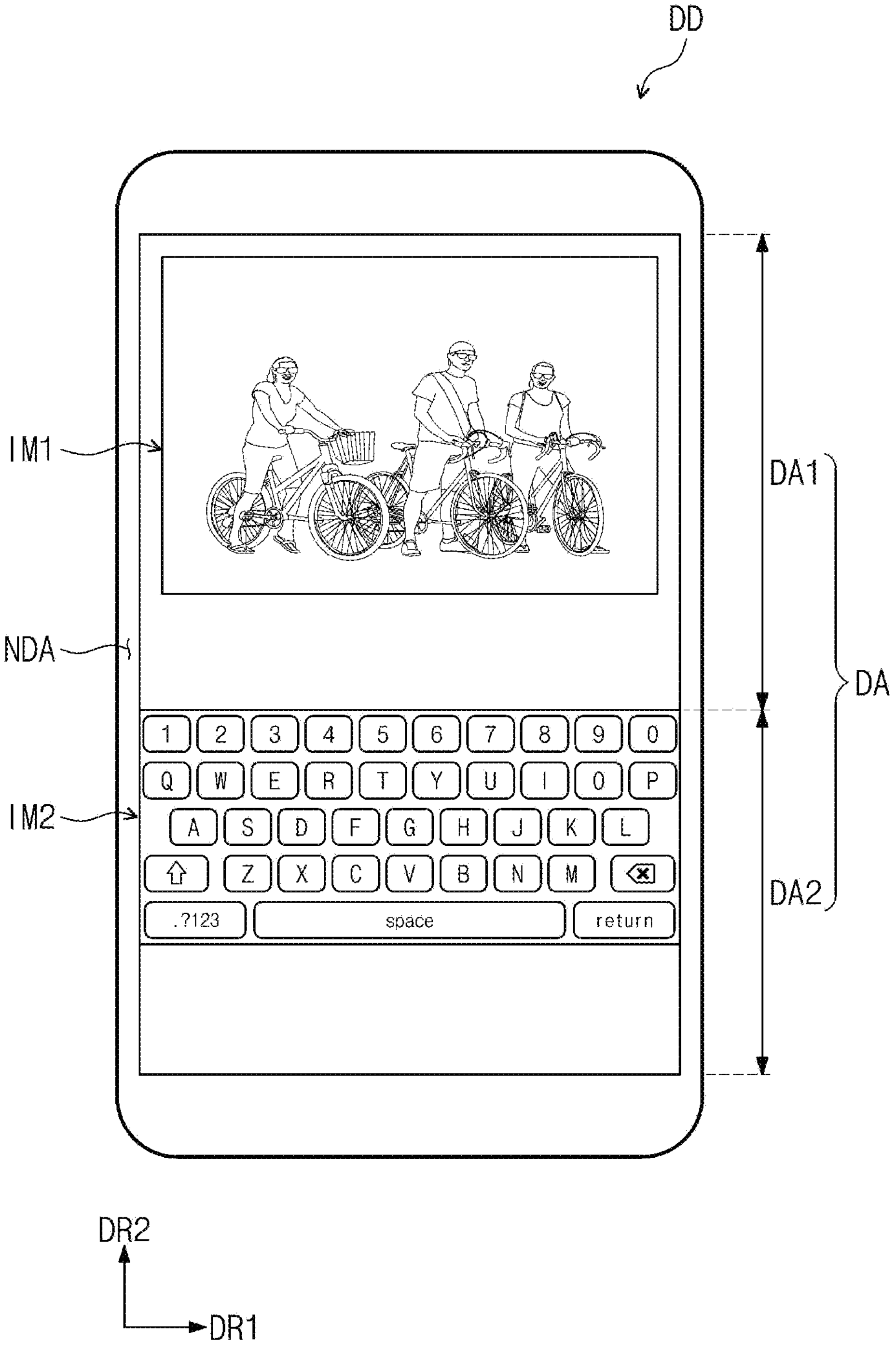
FIG. 1 illustrates a display device, according to an embodiment of the present disclosure.

In the specification, the expression that a first component (or region, layer, part, etc.) is “on”, “connected with”, or “coupled with” a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term “and/or” includes one or more combinations of the associated listed items.

The terms “first”, “second”, etc. are used to describe various components, but the components are not limited by the terms. The terms are used only to differentiate one component from another component. For example, a first component may be named as a second component, and vice versa, without departing from the spirit or scope of the present disclosure. The articles “a,” “an,” and “the” are singular in that they have a single referent, but the use of the singular form in the specification should not preclude the presence of more than one referent. “At least one” is not to be construed as limiting “a” or “an.” “Or” means “and/or.”

As used herein, the term "and/or" includes any and all combinations of one or more of the associated listed items.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 illustrates a display device, according to an embodiment of the present disclosure.

Referring to FIG. 1, a portable terminal is illustrated as an example of a display device DD according to an embodiment of the present disclosure. The portable terminal may include a tablet PC, a smartphone, a Personal Digital Assistant ("PDA"), a Portable Multimedia Player ("PMP"), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The above examples are provided only as an embodiment, and it is obvious that the display device DD may be applied to any other electronic device(s) without departing from the concept of the present disclosure.

As shown in FIG. 1, a display surface, on which a first image IM1 and a second image IM2 are displayed, is parallel to a plane defined by a first direction DR1 and a second direction DR2. The display device DD includes a plurality of areas separated on a display surface. The display surface includes a display area DA, in which the first image IM1 and the second image IM2 are displayed, and a non-display area NDA adjacent to the display area DA. The non-display area NDA may be referred to as a bezel area. For example, the display area DA may have a rectangular shape. The non-display area NDA surrounds the display area DA. Also, although not illustrated, for example, the display device DD may include a partially-curved shape. As a result, one area of the display area DA may have a curved shape.

The display area DA of the display device DD includes a first display area DA1 and a second display area DA2. In a specific application program, the first image IM1 may be displayed on the first display area DA1, and the second image IM2 may be displayed on the second display area DA2. For example, the first image IM1 may be a moving image, and the second image IM2 may be a still image or text information having a long change period.

According to an embodiment, the display device DD may drive the first display area DA1, in which the moving image is displayed, at a normal frequency or a frequency higher than the normal frequency, and may drive the second display area DA2, in which the still image is displayed, at a frequency lower than the normal frequency. The display device DD may reduce power consumption by lowering the operating frequency of the second display area DA2.

The size of each of the first display area DA1 and the second display area DA2 may be a preset size, and may be changed by an application program. In an embodiment, when the still image is displayed in the first display area DA1 and the moving image is displayed in the second display area DA2, the first display area DA1 may be driven at a frequency lower than the normal frequency, and the second display area DA2 may be driven at the normal frequency or a frequency higher than the normal frequency. Besides, the display area DA may be divided into three or more display areas. An operating frequency of each of the display areas may be determined depending on the type (a still image or moving image) of an image displayed in each of the display areas.

Figure 2A:
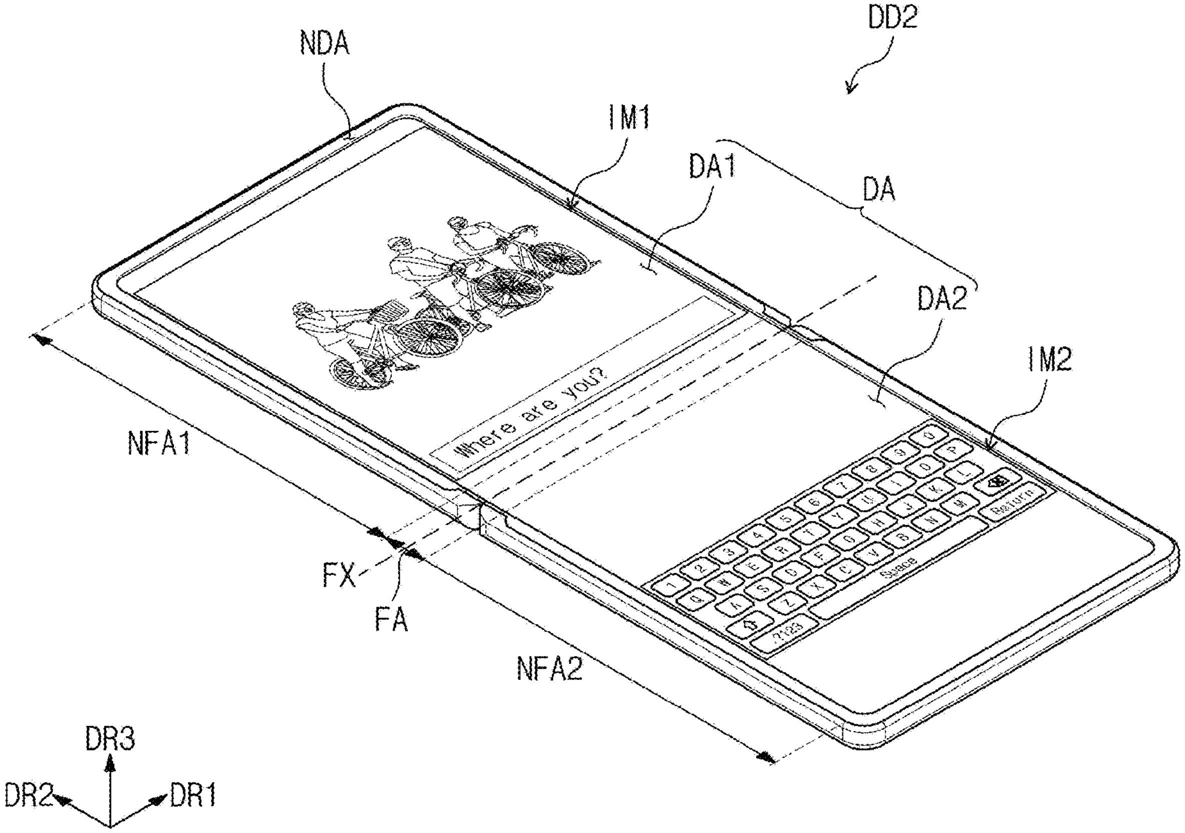
FIGS. 2A and 2B are perspective views of a display device, according to an embodiment of the present disclosure.
Figure 2B:
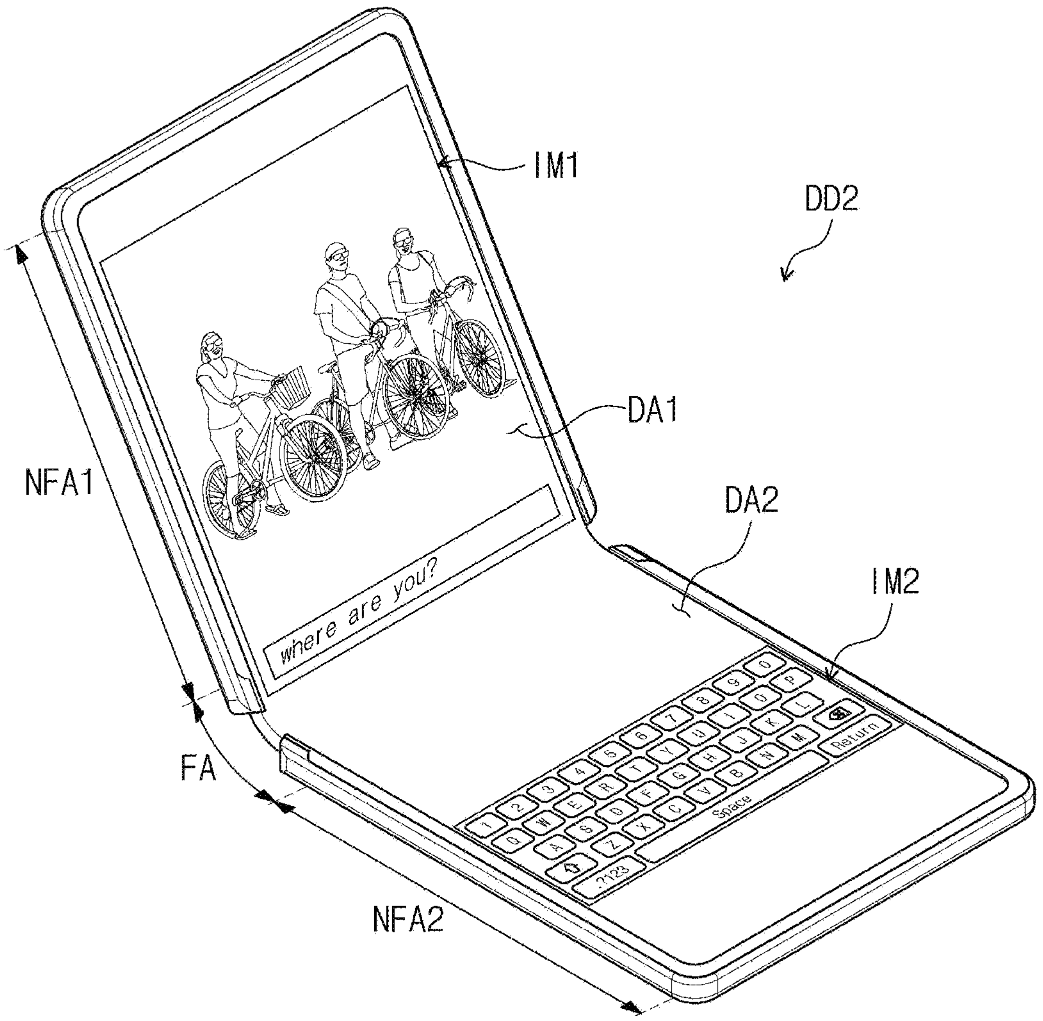

FIGS. 2A and 2B are perspective views of a display device DD2, according to an embodiment of the present disclosure. FIG. 2A illustrates the display device DD2 in an unfolded state. FIG. 2B illustrates the display device DD2 in a folded state.

As shown in FIGS. 2A and 2B, the display device DD2 includes the display area DA and the non-display area NDA. The display device DD2 may display an image through the display area DA. The display area DA may include a plane defined by the first direction DR1 and the second direction DR2, in a state where the display device DD2 is unfolded. The thickness direction of the display device DD2 may be parallel to a third direction DR3 crossing the first direction DR1 and the second direction DR2. Accordingly, the front surfaces (or upper surfaces) and the bottom surfaces (or lower surfaces) of the members constituting the display device DD2 may be defined based on the third direction DR3. The non-display area NDA may be referred to as a bezel area. For example, the display area DA may have a rectangular shape. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "in-folding". However, embodiments are not limited thereto and the operation of the display device DD2 is not limited thereto.

In an embodiment of the present disclosure, when the display device DD2 is folded, the first non-folding area NFA1 and the second non-folding area NFA2 may be opposite to each other. Accordingly, in a state where the display device DD2 is folded, the first non-folding area NFA1 may be exposed to the outside, which may be referred to as "out-folding".

The display device DD2 may perform only one operation of an in-folding operation or an out-folding operation. Alternatively, the display device DD2 may perform both the in-folding operation and the out-folding operation. In this case, the same area of the display device DD2, for example, the folding area FA may be folded inwardly and outwardly.

Alternatively, some areas of the display device DD2 may be folded inwardly, and other areas may be folded outwardly.

One folding area and two non-folding areas are illustrated in FIGS. 2A and 2B, but the number of folding areas and the number of non-folding areas are not limited thereto. For example, the display device DD2 may include a plurality of non-folding areas, of which the number is greater than two, and a plurality of folding areas interposed between non-folding areas adjacent to one another.

FIGS. 2A and 2B illustrate that the folding axis FX is parallel to the minor axis of the display device DD2. However, the present disclosure is not limited thereto. For example, the folding axis FX may extend in a direction parallel to the major axis of the display device DD2, for example, the second direction DR2.

FIGS. 2A and 2B illustrate that the first non-folding area NFA1, the folding area FA, and the second non-folding area NFA2 may be sequentially arranged in the second direction DR2. However, the present disclosure is not limited thereto. For example, the first non-folding area NFA1, the folding area FA, and the second non-folding area NFA2 may be sequentially arranged in the first direction DR1.

The plurality of display areas DA1 and DA2 may be defined in the display area DA of the display device DD2. FIG. 2A illustrates the two display areas DA1 and DA2 as an example. However, the number of display areas DA1 and DA2 is not limited thereto.

The plurality of display areas DA1 and DA2 may include the first display area DA1 and the second display area DA2. For example, the first display area DA1 may be an area where the first image IM1 is displayed, and the second display area DA2 may be an area in which the second image IM2 is displayed. For example, the first image IM1 may be a moving image, and the second image IM2 may be a still image or an image (text information or the like) having a long change period.

The display device DD2 according to an embodiment may operate differently depending on an operating mode. The operating mode may include a single frequency mode NFM and a multi-frequency mode MFM. In the single frequency mode NFM, the display device DD2 may drive both the first display area DA1 and the second display area DA2 at a normal frequency. In the multi-frequency mode MFM, the display device DD2 according to an embodiment may drive the first display area DA1 where the first image IM1 is displayed at a first operating frequency, and may drive the second display area DA2 where the second image IM2 is displayed, at a second operating frequency lower than the normal frequency. In one embodiment, the first operating frequency may be equal to or higher than the normal frequency.

The size of each of the first display area DA1 and the second display area DA2 may be a preset size, and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entire folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be greater than the size of the first display area DA1.

In an embodiment, the first display area DA1 may correspond to the first non-folding area NFA1, the folding area FA, and the first portion of the second non-folding area NFA2, and the second display area DA2 may be the second portion of the second non-folding area NFA2. That is, the size of the first display area DA1 may be greater than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrate that the display device DD2 has one folding area, as an example of a display device. However, the present disclosure is not limited thereto. For example, the present disclosure may also be applied to a display device having two or more folding areas, a rollable display device, or a slidable display device.

Hereinafter, the display device DD shown in FIG. 1 will be described as an example. However, the display device DD shown in FIG. 1 may be identically applied to the display device DD2 shown in FIGS. 2A and 2B.

Figure 3A:
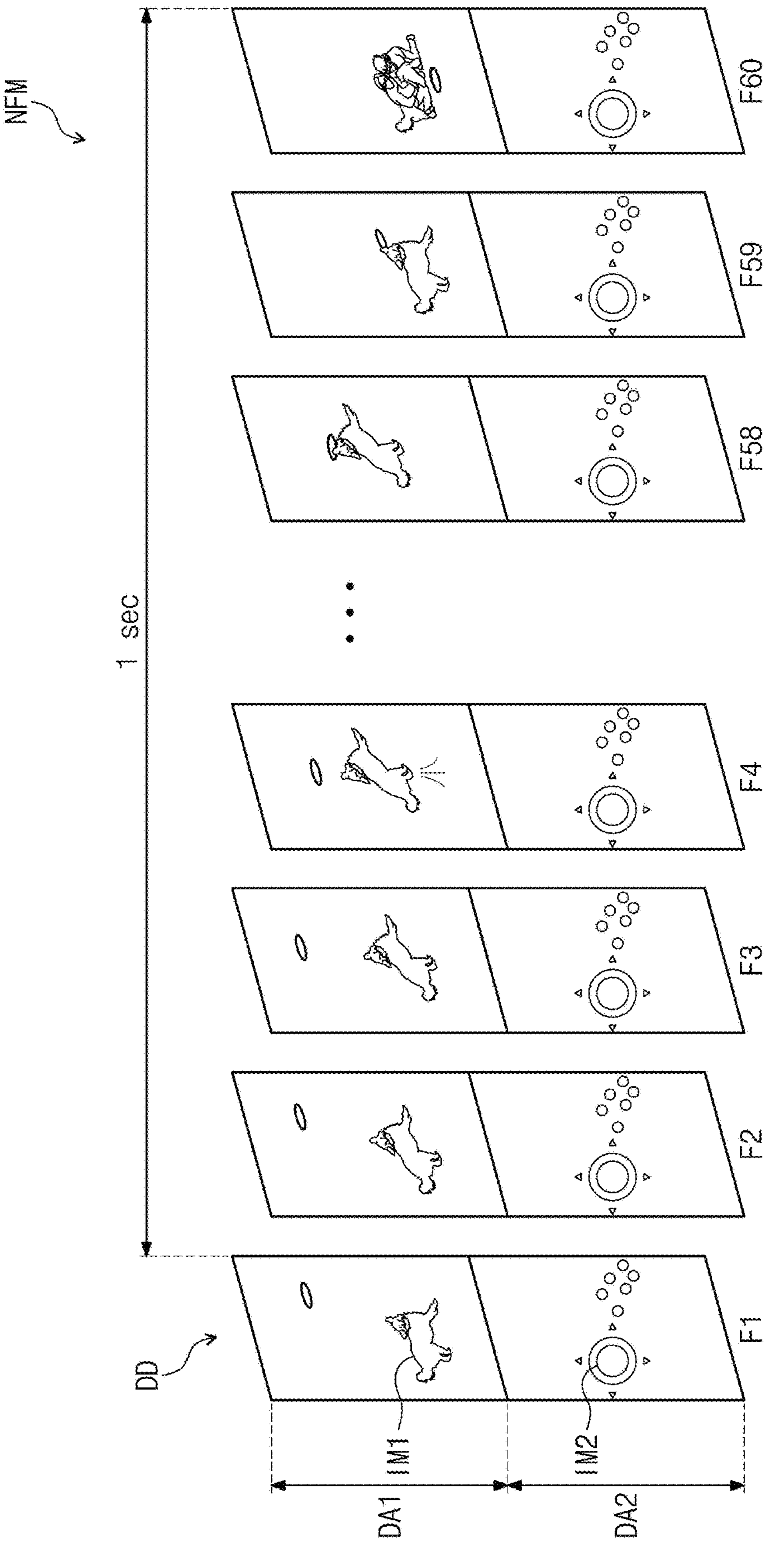
FIG. 3A is a diagram for describing an operation of a display device in a single frequency mode.
Figure 3B:
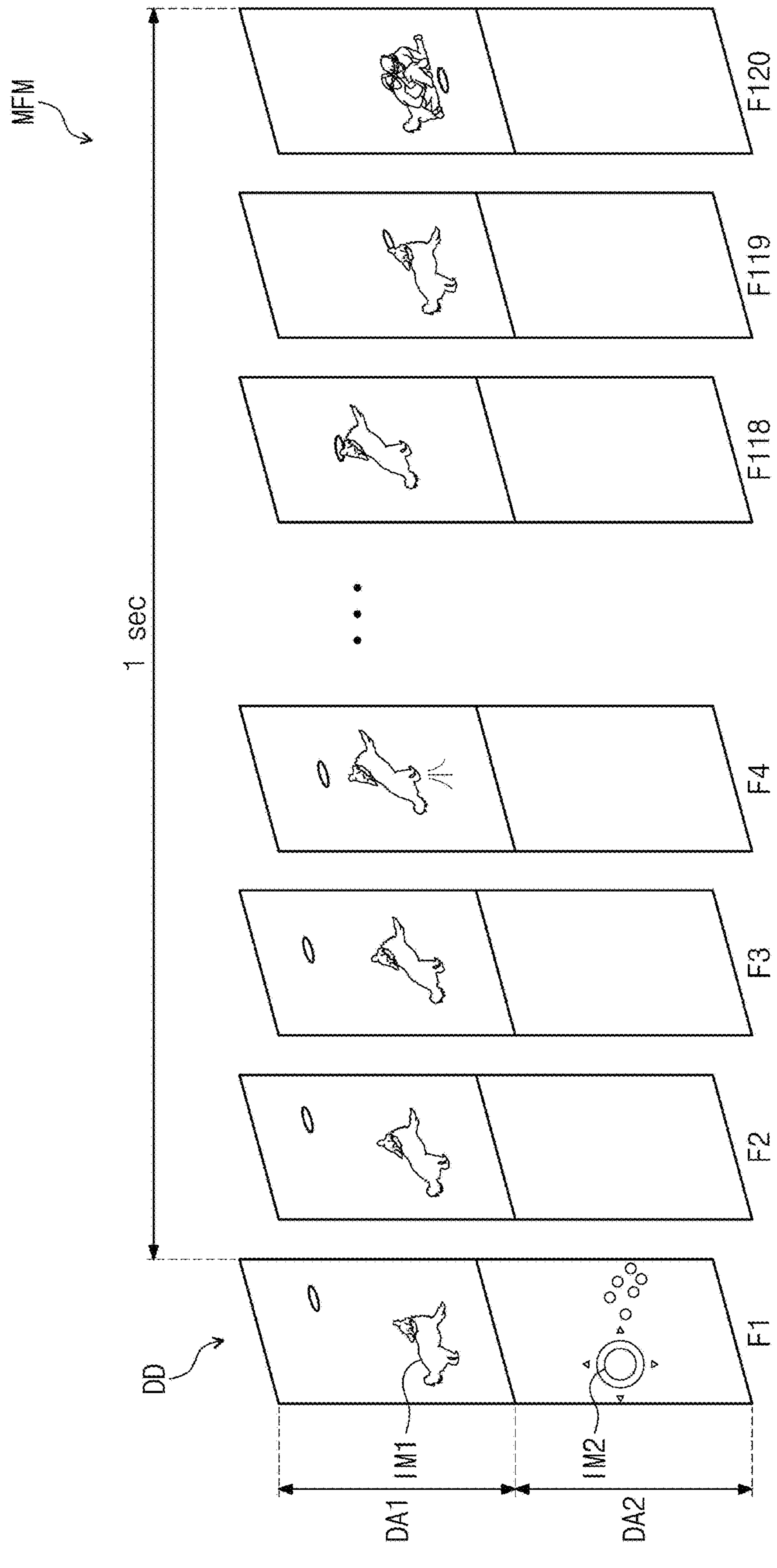
FIG. 3B is a diagram for describing an operation of a display device in a multi-frequency mode.

FIG. 3A is a diagram for describing an operation of a display device in a single frequency mode. FIG. 3B is a diagram for describing an operation of a display device in a multi-frequency mode.

Referring to FIG. 3A, the first image IM1 displayed in the first display area DA1 may be a moving image. The second image IM2 displayed in the second display area DA2 may be a still image or an image (e.g., a keypad for game operation) having a long change period. The first image IM1 displayed in the first display area DA1 shown in FIG. 1 and the second image IM2 displayed in the second display area DA2 are examples, and various images may be displayed on the display device DD.

In a single frequency mode NFM, the operating frequencies of the first display area DA1 and the second display area DA2 of the display device DD are the same normal frequency. For example, the normal frequency may be 60 hertz (Hz) or 120 Hz. In the single frequency mode NFM, images of the first to 60th frames F1 to F60 may sequentially be displayed in the first display area DA1 and the second display area DA2 of the display device DD for 1 second.

Referring to FIG. 3B, in the multi-frequency mode MFM, the display device DD may set an operating frequency of the first display area DA1, in which the first image IM1 (i.e., a moving image) is displayed, as the first operating frequency, and may set an operating frequency of the second display area DA2, in which the second image IM2 (i.e., a still image) is displayed, as a second operating frequency lower than the first operating frequency. The first operating frequency may be 120 Hz, and the second operating frequency may be 1 Hz. The first operating frequency and the second operating frequency may be variously changed. For another example, the first operating frequency may be 60 Hz or 240 Hz, and the second operating frequency may be 2 Hz, 3 Hz, 4 Hz or 5 Hz.

In the multi-frequency mode MFM, when the first operating frequency is 120 Hz and the second operating frequency is 1 Hz, the first image IM1 may sequentially be displayed in each of the first to 120th frames F1 to F120 in the first display area DA1 of the display device DD for 1 second. The second image IM2 may be displayed only in the first frame F1 in the second display area DA2, and an image may be kept in the remaining frames F2 to F120. In this view, each of the second to 120th frames F2 to F120 among the first to 120th frames F1 to F120 of the multi-frequency mode MFM may be named as a "hold" frame. The operation of the display device DD in the multi-frequency mode MFM will be described in detail later.

Figure 4:
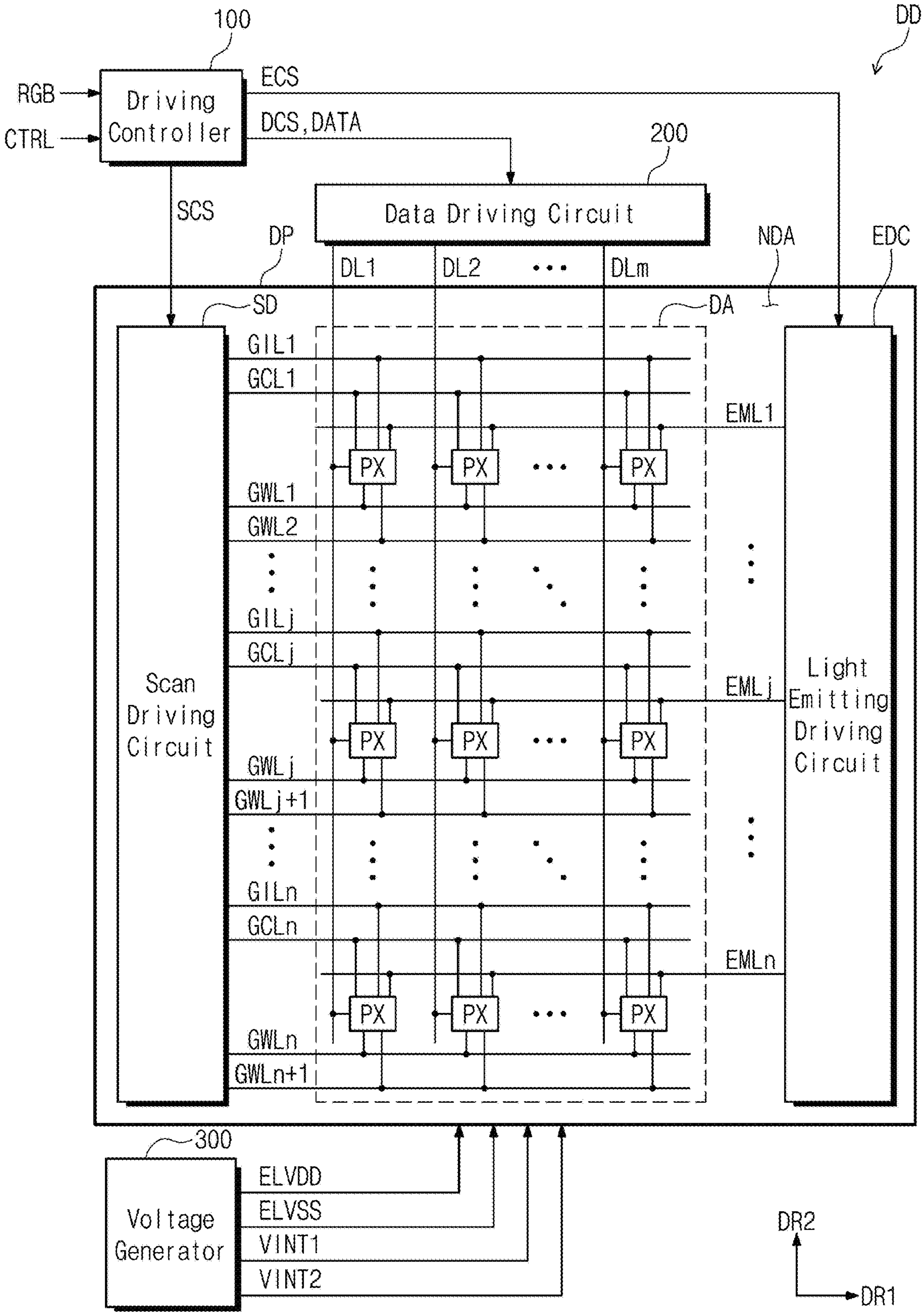
FIG. 4 is a block diagram of a display device according to an embodiment of the present disclosure.

FIG. 4 is a block diagram of a display device according to an embodiment of the present disclosure.

Referring to FIG. 4, a display device DD includes a display panel DP, a driving controller 100, a data driving circuit 200, and a voltage generator 300.

The driving controller 100 receives an image signal RGB and a control signal CTRL. The driving controller 100 generates image data signal DATA by converting a data format of the image signal RGB so as to be suitable for the interface specification of the data driving circuit 200. The driving controller 100 outputs a scan control signal SCS, a data control signal DCS, the image data signal DATA, and a light emitting control signal ECS.

The data driving circuit 200 receives the data control signal DCS and the image data signal DATA from the driving controller 100. The data driving circuit 200 converts the image data signal DATA into data signals and then outputs the data signals to a plurality of data lines DL1 to DLm to be described later. 'm' is a positive integer. The data signals are analog voltages corresponding to grayscale values of the image data signal DATA.

The voltage generator 300 generates voltages to operate the display panel DP. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, light emitting control lines EML1 to EMLn, the data lines DL1 to DLm and the pixels PX. 'n' is a positive integer. The display panel DP may further include a scan driving circuit SD and a light emitting driving circuit EDC. In an embodiment, the scan driving circuit SD may be arranged on a first side of the display panel DP. The scan lines GIL1 to GILn, GCL1 to GCLn, and GWL1 to GWLn+1 extend from the scan driving circuit SD in the first direction DR1.

The light emitting driving circuit EDC is arranged on a second side of the display panel DP. The light emitting control lines EML1 to EMLn extend from the light emitting driving circuit EDC in a direction opposite to the first direction DR1.

The scan lines GIL1 to GILn, GCL1 to GCLn, and GWL1 to GWLn+1 and the light emitting control lines EML1 to EMLn are arranged to be spaced apart from one another in the second direction DR2. The data lines DL1 to DLm extend from the data driving circuit 200 in a direction opposite to the second direction DR2, and are arranged spaced apart from one another in the first direction DR1.

In the example shown in FIG. 4, the scan driving circuit SD and the light emitting driving circuit EDC are arranged to face each other with the pixels PX interposed therebetween, but the present disclosure is not limited thereto. For example, the scan driving circuit SD and the light emitting driving circuit EDC may be disposed adjacent to each other on one of the first side and the second side of the display panel DP in another embodiment. In an embodiment, the scan driving circuit SD and the light emitting driving circuit EDC may be implemented with one circuit.

The plurality of pixels PX are electrically connected to the scan lines GIL1 to GILn, GCL1 to GCLn, and GWL1 to GWLn+1, the light emitting control lines EML1 to EMLn, and the data lines DL1 to DLm. Each of the plurality of pixels PX may be electrically connected to four scan lines and one light emitting control line. For example, as shown in FIG. 4, pixels PX in a first row may be connected to the scan lines GIL1, GCL1, GWL1, and GWL2 and the light emitting control line EML1. Furthermore, pixels PX in a j-th row may be connected to the scan lines GILj, GCLj, GWLj, and GWLj+1 and the light emitting control line EMLj.

Each of the plurality of pixels PX includes a light emitting diode ED (refer to FIG. 5) and a pixel circuit PXC (refer to FIG. 5) for controlling the light emission of the light emitting diode ED. The pixel circuit PXC may include one or more transistors and one or more capacitors. The scan driving circuit SD and the light emitting driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. The circuit configuration and operation of the scan driving circuit SD will be described in detail later.

According to one embodiment, the driving controller 100 may divide the display panel DP into a first display area DA1 (refer to FIG. 1) and a second display area DA2 (refer to FIG. 1) based on the image signal RGB, and may set an operating frequency of each of the first display area DA1 and the second display area DA2. For example, in a single frequency mode NFM, the driving controller 100 drives the first display area DA1 and the second display area DA2 at a normal frequency (e.g., 60 Hz). In a multi-frequency mode MFM, the driving controller 100 may drive the first display area DA1 at a first operating frequency (e.g., 120 Hz) and the second display area DA2 at a second operating frequency (e.g., 1 Hz).

The driving controller 100 according to an embodiment of the present disclosure may output the scan control signal SCS for changing a waveform of a scan signal provided to the scan lines GWL1 to GWLn+1 depending on duration of the multi-frequency mode MFM.

Figure 5:
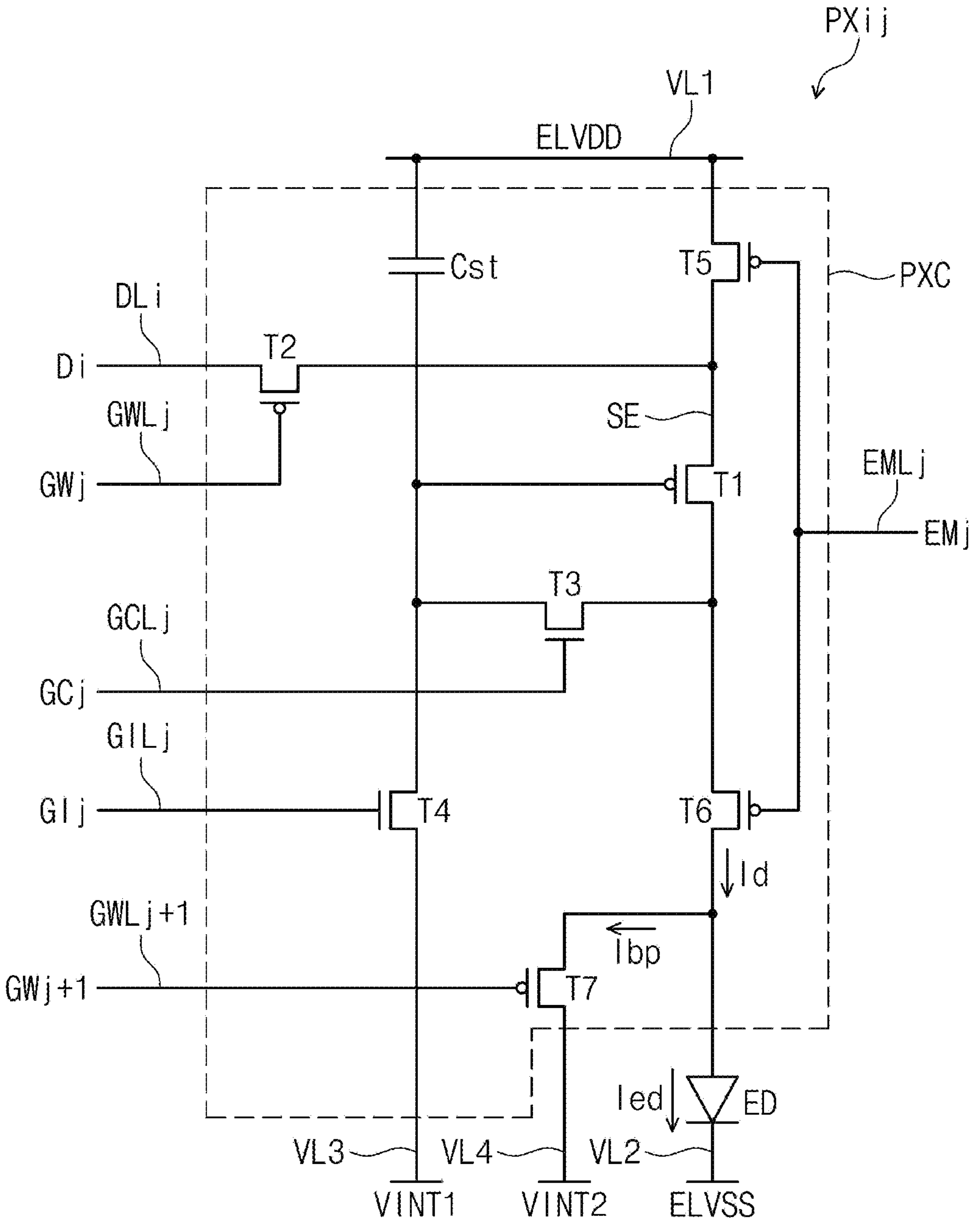
FIG. 5 is an equivalent circuit diagram of a pixel, according to an embodiment of the present disclosure.

FIG. 5 is an equivalent circuit diagram of a pixel, according to an embodiment of the present disclosure.

FIG. 5 illustrates an equivalent circuit diagram of a pixel PXij connected to the i-th data line DLi among the data lines DL1 to DLm, the j-th scan lines GILj, GCLj, and GWLj and the (j+1)-th scan line GWLj+1 among the scan lines GIL1 to GILn, GCL1 to GCLn, and GWL1 to GWLn+1, and the j-th light emitting control line EMLj among the light emitting control lines EML1 to EMLn, which are illustrated in FIG. 4. 'i' is a positive integer no more than m, and 'j' is a positive integer no more than n. The pixel PXij may be located in i-th column and j-th row in a matrix of the plurality of pixels PX.

Each of the plurality of pixels PX shown in FIG. 4 may have the same circuit configuration as the equivalent circuit diagram of the pixel PXij shown in FIG. 5.

Referring to FIG. 5, a pixel PXij of a display device according to an embodiment includes a pixel circuit PXC and at least one light emitting diode ED. In an embodiment, it is described that the one pixel PXij includes one light emitting diode ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors by using an oxide semiconductor as a semiconductor layer. Each of the first, second, fifth, sixth, and seventh transistors T1, T2, T5, T6, and T7 is a P-type transistor having a low-temperature polycrystalline silicon ("LTPS") semiconductor layer. However, the present disclosure is not limited thereto, and all of the first to seventh transistors T1 to T7 may be P-type transistors or N-type transistors. In an embodiment, at least one of the first to seventh transistors T1 to T7 may be an N-type transistor, and the remaining transistors may be P-type transistors. Moreover, the circuit configuration of a pixel according to an embodiment of the present disclosure is not limited to FIG. 5. The pixel circuit PXC illustrated in FIG. 5 is only an example. For example, the configuration of the pixel circuit PXC may be modified and implemented.

The scan lines GILj, GCLj, GWLj, and GWLj+1 may deliver scan signals GIj, GCj, GWj, and GWj+1, respectively. The light emitting control line EMLj may deliver a light emitting control signal EMj. The data line DLi delivers a data signal Di. The data signal Di may have a voltage level corresponding to the image signal RGB input to the display device DD (refer to FIG. 4). First to fourth driving voltage lines VL1, VL2, VL3, and VL4 may deliver the first driving voltage ELVDD, the second driving voltage ELVSS, the first initialization voltage VINT1, and the second initialization voltage VINT2, respectively.

The first transistor T1 includes a first electrode SE connected to the first driving voltage line VL1 via the fifth transistor T5, a second electrode electrically connected to an anode of the light emitting diode ED via the sixth transistor T6, and a gate electrode connected to one end of the capacitor Cst. The first transistor T1 may receive the data signal Di delivered by the data line DLi depending on the switching operation of the second transistor T2 and then may supply a driving current Id to the light emitting diode ED.

The second transistor T2 includes a first electrode connected to the data line DLi, a second electrode connected to the first electrode SE of the first transistor T1, and a gate electrode connected to the scan line GWLj. The second transistor T2 may be turned on depending on the scan signal GWj received through the scan line GWLj and then may deliver the data signal Di delivered from the data line DLi to the first electrode SE of the first transistor T1.

The third transistor T3 includes a first electrode connected to the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected, that is, the first transistor T1 may be diode-connected.

The fourth transistor T4 includes a first electrode connected to the gate electrode of the first transistor T1, a second electrode connected to the third driving voltage line VL3 through which the first initialization voltage VINT1 is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the first initialization voltage VINT1 to the gate electrode of the first transistor T1.

The fifth transistor T5 includes a first electrode connected to the first driving voltage line VL1, a second electrode connected to the first electrode SE of the first transistor T1, and a gate electrode connected to the light emitting control line EMLj.

The sixth transistor T6 includes a first electrode connected to the second electrode of the first transistor T1, a second electrode connected to the anode of the light emitting diode ED, and a gate electrode connected to the light emitting control line EMLj.

The fifth transistor T5 and the sixth transistor T6 may be simultaneously turned on depending on the light emitting control signal EMj received through the light emitting control line EMLj. In this way, the first driving voltage ELVDD may be compensated through the first transistor T1 thus diode-connected and may be supplied to the light emitting diode ED.

The seventh transistor T7 includes a first electrode connected to the second electrode of the sixth transistor T6, a second electrode connected to the fourth driving voltage line VL4, and a gate electrode connected to the scan line GWLj+1. The seventh transistor T7 is turned on depending on the scan signal GWj+1 received through the scan line GWLj+1, and bypasses a current of the anode of the light emitting diode ED to the fourth driving voltage line VL4.

As described above, one end of the capacitor Cst is connected to the gate electrode of the first transistor T1, and the other end of the capacitor Cst is connected to the first driving voltage line VL1. The cathode of the light emitting diode ED may be connected to the second driving voltage line VL2 that delivers the second driving voltage ELVSS. A structure of the pixel PXij according to an embodiment is not limited to the structure shown in FIG. 5. The number of transistors included in the one pixel PXij, the number of capacitors, and the connection relationship thereof may be variously modified.

Figure 6:
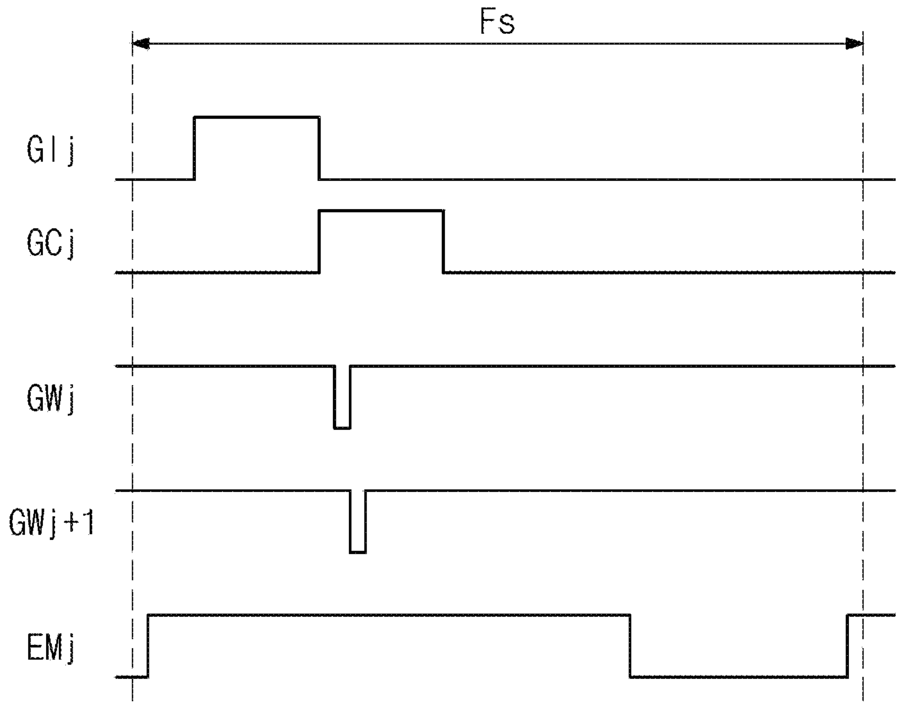
FIG. 6 is a timing diagram for describing an operation of a pixel illustrated in FIG. 5.

FIG. 6 is a timing diagram for describing an operation of a pixel illustrated in FIG. 5. Hereinafter, an operation of a display device according to an embodiment will be described with reference to FIGS. 5 and 6.

Referring to FIGS. 5 and 6, the scan signal GIj having a high level is provided through the scan line GILj during an initialization period within one frame Fs. When the fourth transistor T4 is turned on in response to the scan signal GIj having a high level, the first initialization voltage VINT1 is supplied to the gate electrode of the first transistor T1 through the fourth transistor T4 so as to initialize the first transistor T1.

Next, when the scan signal GCj having a high level is supplied through the scan line GCLj during data programming and compensation period, the third transistor T3 is turned on. The first transistor T1 is diode-connected by the third transistor T3 turned on and is forward-biased. At this time, when the scan signal GWj having a low level is supplied through the scan line GWLj, the second transistor T2 is turned on. In the case, a compensation voltage, which is obtained by reducing the voltage of the data signal Di supplied from the data line DLi by a threshold voltage of the first transistor T1, is applied to the gate electrode of the first transistor T1. That is, a gate voltage applied to the gate electrode of the first transistor T1 may be a compensation voltage.

As the first driving voltage ELVDD and the compensation voltage are respectively applied to opposite two ends of the capacitor Cst, a charge corresponding to a difference between the first driving voltage ELVDD and the compensation voltage may be stored in the capacitor Cst.

In the meantime, the seventh transistor T7 is turned on in response to the scan signal GWj+1 having a low level delivered through the scan line GWLj+1. A part of the driving current Id may be drained through the seventh transistor T7 as a bypass current Ibp.

When the light emitting diode ED emits light under the condition that a minimum current of the first transistor T1 flows as a driving current Id for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting diode ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current Id (e.g., a current of 10 picoamperes (pA) or less) is delivered to the light emitting diode ED, with the first transistor T1 turned off, an image of black luminance is expressed. When the minimum driving current Id for displaying a black image flows, the influence of a bypass transfer of the bypass current Ibp may be great; on the other hand, when a large driving current Id for displaying an image such as a normal image or a white image flows, there may be almost no influence of the bypass current Ibp. Accordingly, when a driving current Id for displaying a black image flows, a light-emitting current led of the light emitting diode ED, which corresponds to a result of subtracting the bypass current Ibp drained through the seventh transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GWj+1 having a low level, but is not necessarily limited thereto.

Next, during a light emitting period, the light emitting control signal EMj supplied from the light emitting control line EMLj is changed from a high level to a low level. During a light emitting period, the fifth transistor T5 and the sixth transistor T6 are turned on by the light emitting control signal EMj having a low level. In this case, the driving current Id is generated depending on a voltage difference between the gate voltage of the gate electrode of the first transistor T1 and the first driving voltage ELVDD and is supplied to the light emitting diode ED through the sixth transistor T6, and the light-emitting current led flows through the light emitting diode ED.

Figure 7A:
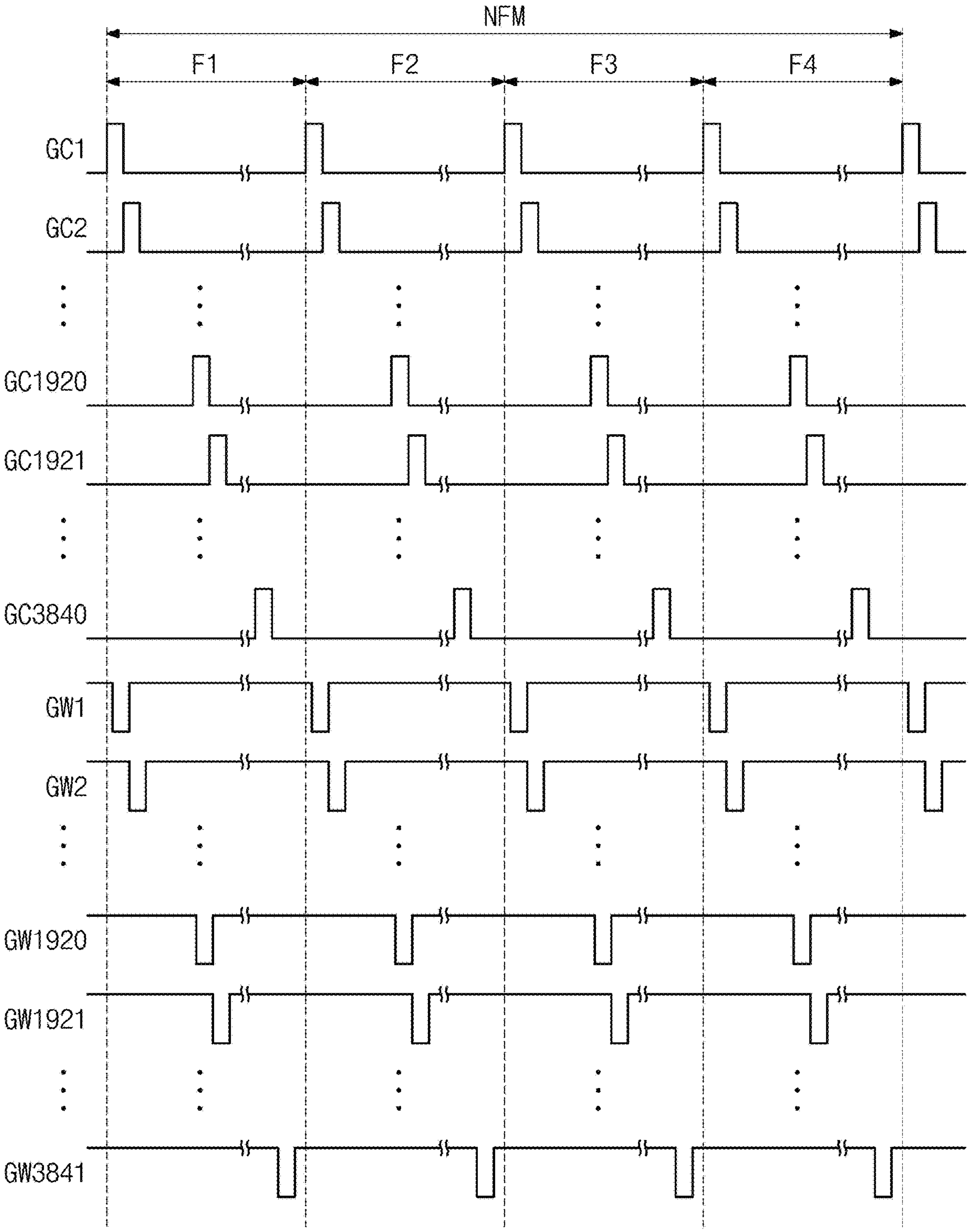
FIG. 7A illustrates scan signals in a single frequency mode.

FIG. 7A illustrates scan signals GC1 to GC3840 and scan signals GW1 to GW3841 in a single frequency mode NFM.

Figure 7B:
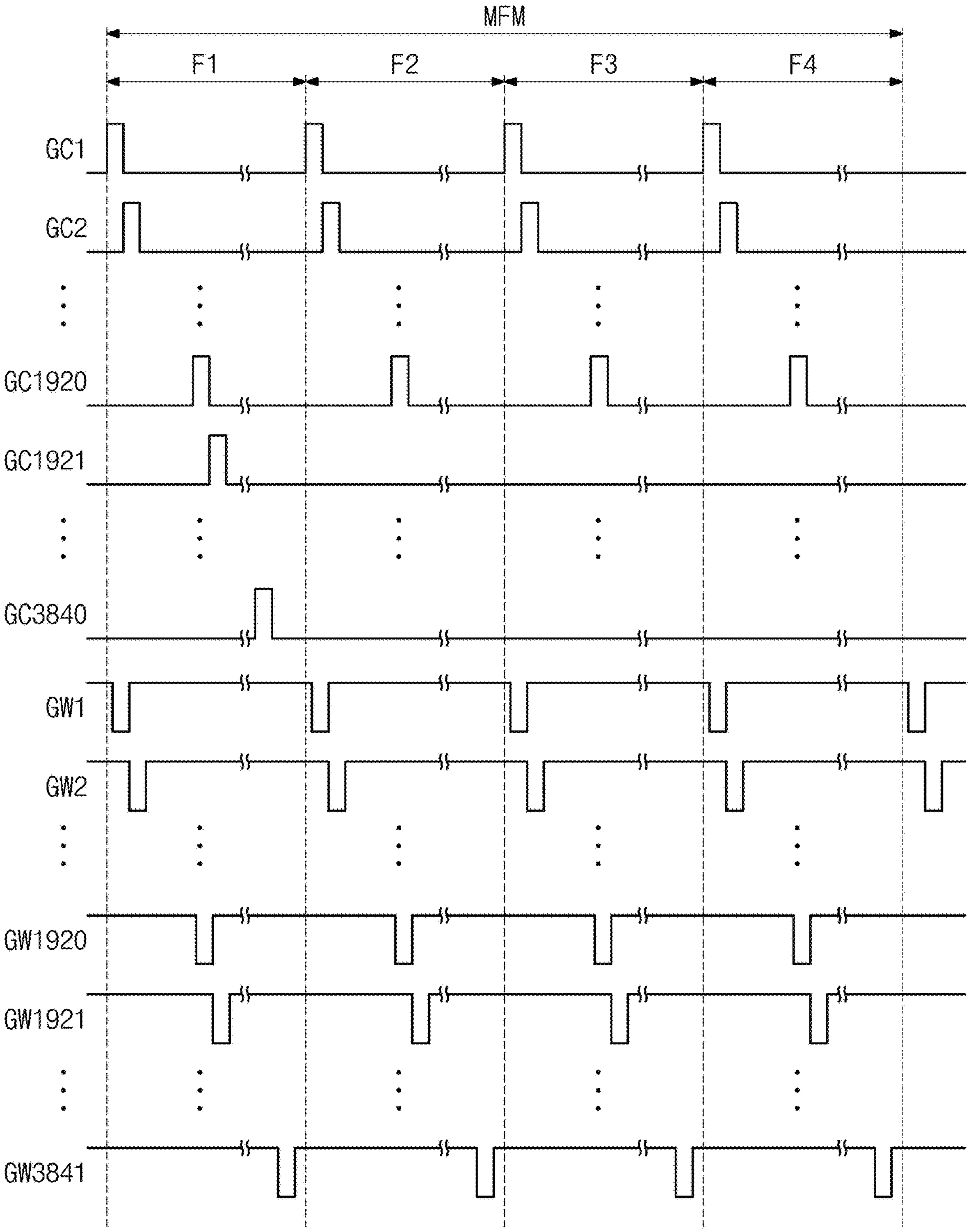
FIG. 7B illustrates scan signals in a multi-frequency mode.

FIG. 7B illustrates scan signals GC1 to GC3840 and scan signals GW1 to GW3841 in a multi-frequency mode MFM.

FIGS. 7A and 7B illustrate that the first display area DA1 shown in FIG. 1 corresponds to the scan signals GC1 to GC1920 and the scan signals GW1 to GW1921, and the second display area DA2 shown in FIG. 1 corresponds to the scan signals GC1921 to GC3840 and the scan signals GW1921 to GW3841, as an example. The numbers of scan signals corresponding to the first display area DA1 and the second display area DA2, respectively, may be variously changed.

First of all, referring to FIGS. 4 and 7A, when the operating frequency is the first operating frequency (e.g., 120 Hz) in both the first display area DA1 and the second display area DA2 during the single frequency mode NFM, the scan driving circuit SD sequentially activates the scan signals GC1 to GC3840 to a high level in each of the first to fourth frames F1 to F4, and sequentially activates the scan signals GW1 to GW3841 to a low level in each of the first to fourth frames F1 to F4. FIG. 7A illustrates only the scan signals GC1 to GC3840 and the scan signals GW1 to GW3841. However, the scan signals GI1 to GI3840 and the light emitting control signals EM1 to EM3840 may also be sequentially activated in each of the first to fourth frames F1 to F4.

FIG. 7A illustrates only the first to fourth frames F1 to F4. However, the scan signals GC1 to GC3840 and the scan signals GW1 to GW3841 may be sequentially activated in each of the first to 60th frames F1 to F60 of the single frequency mode NFM shown in FIG. 3A in the same manner as the first to fourth frames F1 to F4 illustrated in FIG. 7A.

FIG. 7B illustrates scan signals GC1 to GC3840 and scan signals GW1 to GW3841 in a multi-frequency mode MFM.

Referring to FIGS. 4 and 7B, when the operating frequency is the first operating frequency (e.g., 120 Hz) in the first display area DA1 and the second operating frequency (e.g., 1 Hz) in the second display area DA2 during the multi-frequency mode MFM, the scan signals GC1 to GC3840 are sequentially activated to a high level during the first frame F1, and the scan signals GW1 to GW3841 are sequentially activated to a low level during the first frame F1.

Although not shown in FIG. 7B, during the first frame F1 of the multi-frequency mode MFM, the scan signals GI1 to GI3840 and the light emitting control signals EM1 to EM3840 are also sequentially activated to an active level.

In each of the second to fourth frames F2 to F4, the scan signals GC1 to GC1920 are sequentially activated to a high level, and the scan signals GC1921 to GC3840 are maintained at an inactive level (e.g., a low level).

In each of the second to fourth frames F2 to F4, the scan signals GW1 to GW3841 are sequentially activated to a low level.

Although not shown in FIG. 7B, in each of the second to fourth frames F2 to F4 of the multi-frequency mode MFM, the scan signals GI1 to GI1920 are sequentially activated to a high level, and the scan signals GI1921 to GI3840 may be maintained at an inactive level (e.g., a low level) in the same manner as the scan signals GC1921 to GC3840. In each of the second to fourth frames F2 to F4 of the multi-frequency mode MFM, the light emitting control signals EM1 to EM3840 may be sequentially activated to a low level in the same manner as the scan signals GW1 to GW3841.

FIG. 7B illustrates only the four frames F1, F2, F3, and F4. However, in each of the second to 120th frames F2 to F120 among the first to 120th frames F1 to F120 of the multi-frequency mode MFM shown in FIG. 3B, the scan signals GC1921 to GC3840 and the scan signals GI1921 to GI3840 may be maintained at an inactive level in the same manner as the second to fourth frames F2 to F4 shown in FIG. 7B, and the scan signals GW1 to GW3841 and the light emitting control signals EM1 to EM3840 may be sequentially activated.

As the scan signals GI1921 to GI3840 and the scan signals GC1921 to GC3840 are maintained at an inactive level (i.e., a low level) in each of the second to fourth frames F2 to F4 of the multi-frequency mode MFM, the second display area DA2 is driven at a frequency lower than the normal frequency. The display device DD may reduce power consumption by lowering the operating frequency of the second display area DA2.

In each of the second to fourth frames F2 to F4 of the multi-frequency mode MFM, the scan signals GW1921 to GW3841 sequentially transition to an active level, that is, a low level. At this time, as a bias voltage Vbias (refer to FIG. 9B) is provided to the data lines DL1 to DLm (refer to FIG. 4) to be provided at the second display area DA2, the first transistor T1 may be in an on-bias state.

FIG. 7B illustrates that scan signals GW1921 to GW3841 each transition to an active level once in each of the first to fourth frames F1-F4 during the multi-frequency mode MFM. However, the present disclosure is not limited thereto. For example, as illustrated in FIG. 8B, the scan signals GW1921 to GW3841 may transition to the active level two or more times in each of the first to fourth frames F1 to F4 during the multi-frequency mode MFM.

Figure 8A:
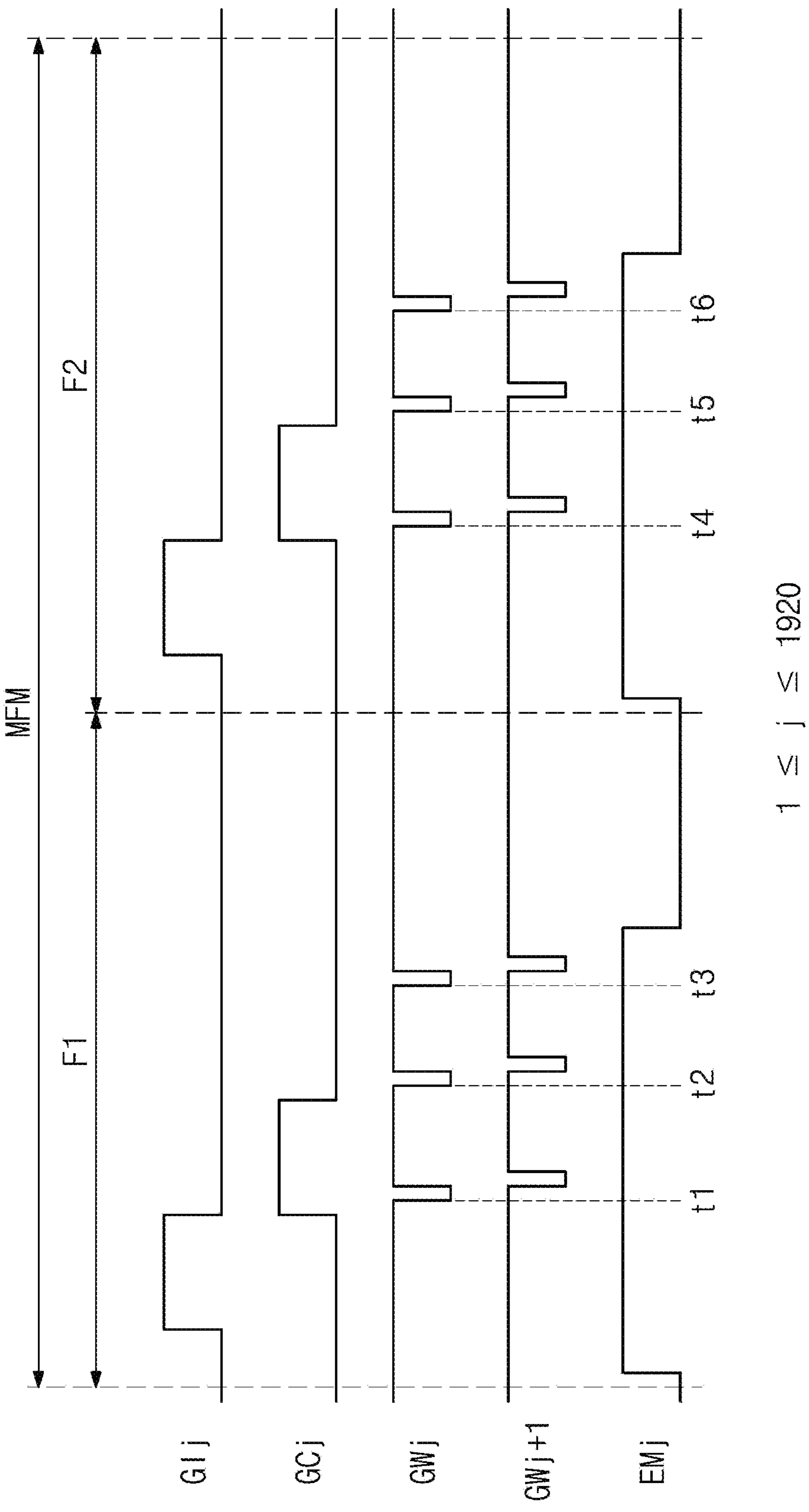
FIGS. 8A and 8B are timing diagrams for describing an operation of a pixel during a first frame and a second frame of a multi-frequency mode.

FIG. 8A is a timing diagram for describing an operation of a pixel in a first display area in a multi-frequency mode.

Figure 8B:
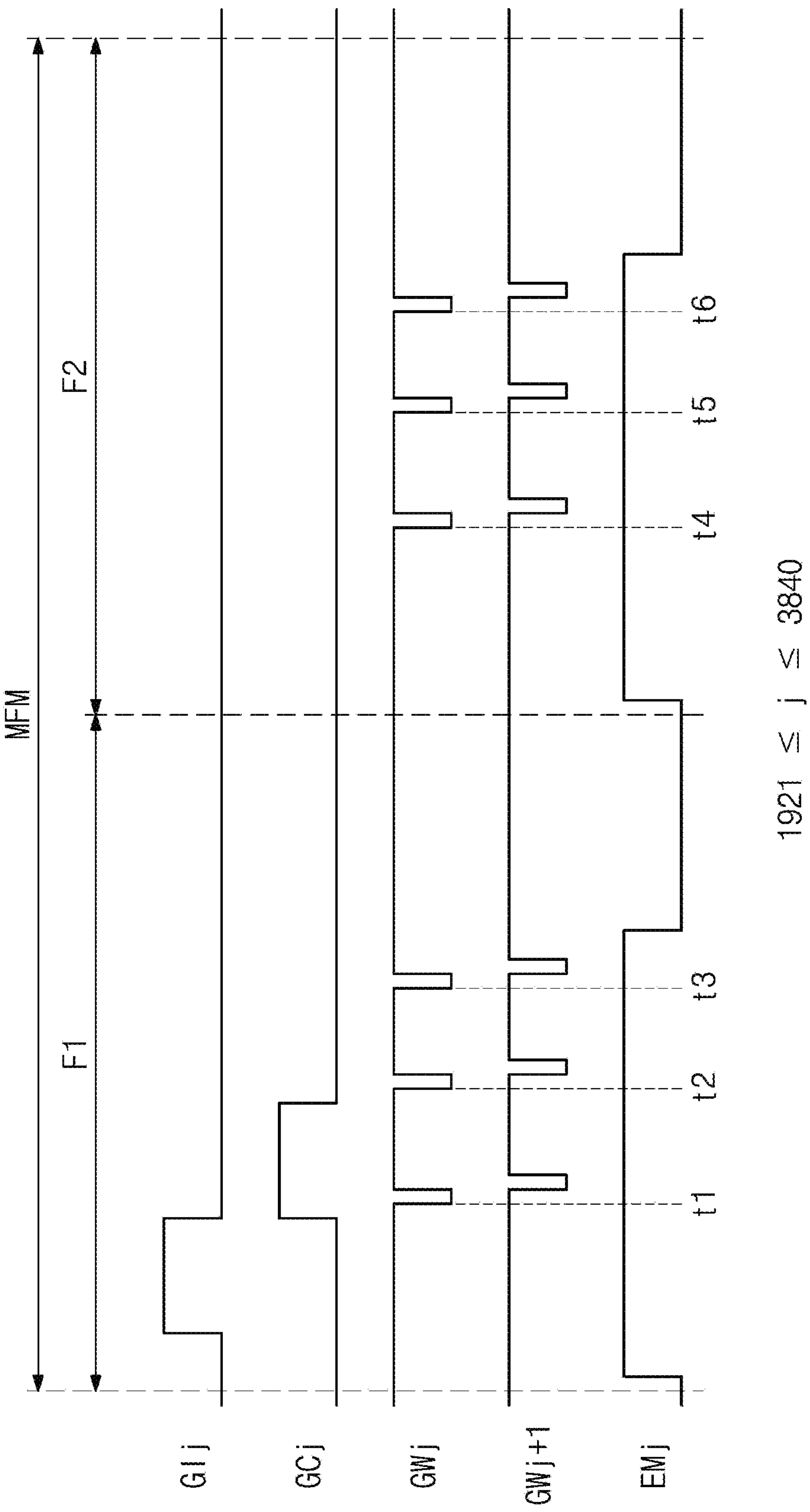

FIG. 8B is a timing diagram for describing an operation of a pixel in a second display area in a multi-frequency mode.

Figure 9A:
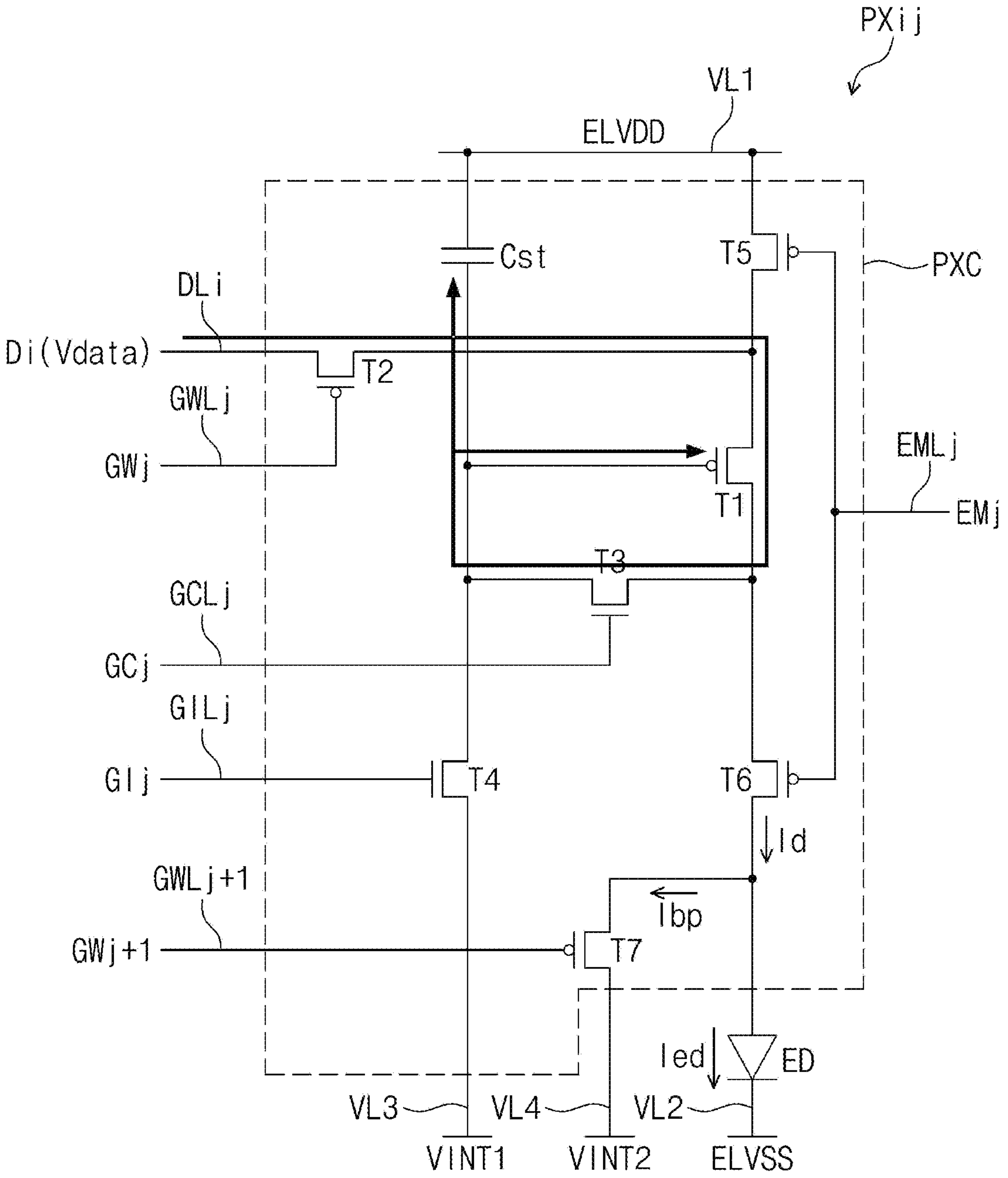
FIG. 9A is a diagram for describing an operation of a pixel during a first frame of the multi-frequency mode.

FIG. 9A is a diagram for describing an operation of a pixel during a first frame of a multi-frequency mode.

Figure 9B:
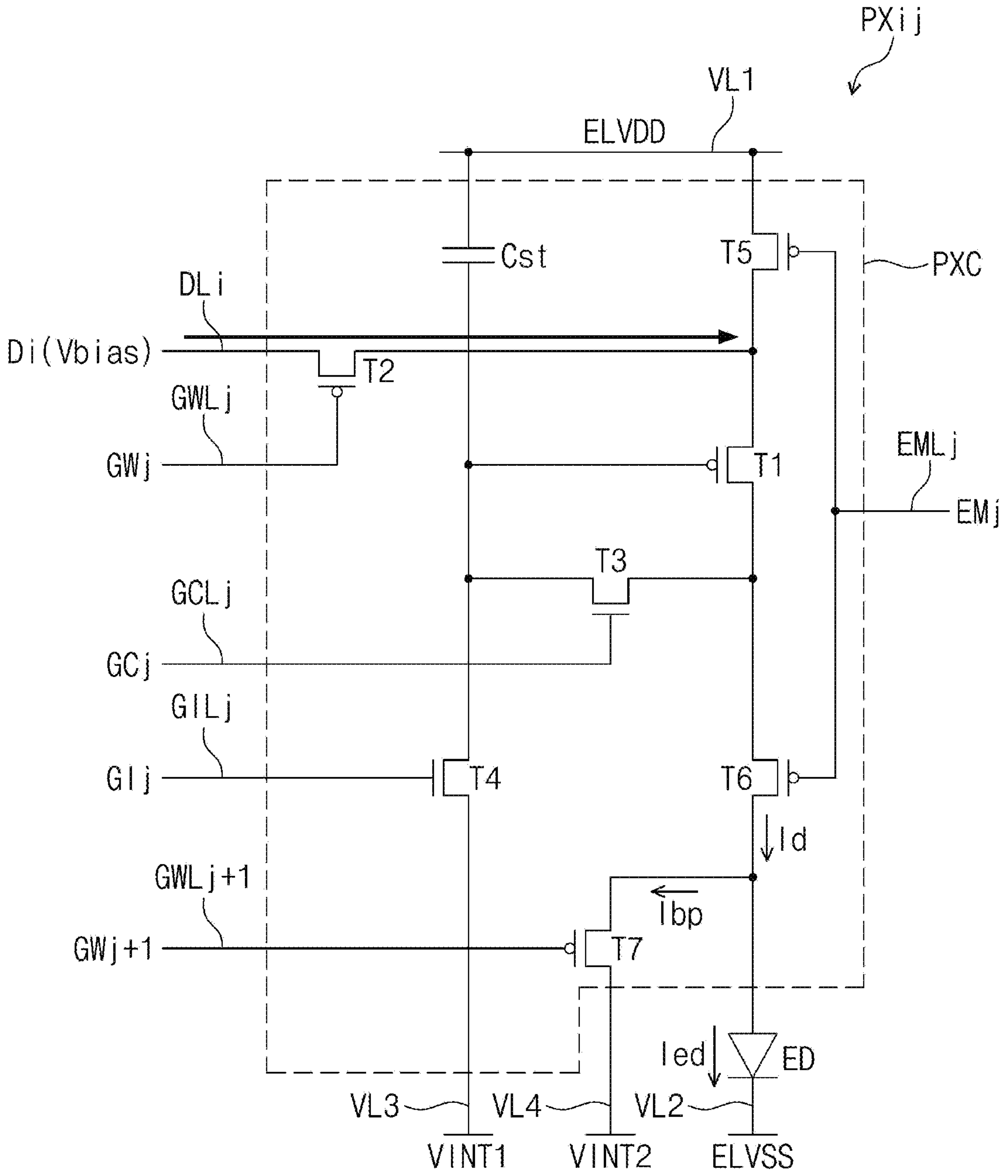
FIG. 9B is a diagram for describing an operation of a pixel in a second frame shown in FIGS. 8A and 8B.

FIG. 9B is a diagram for describing an operation of a pixel during a second frame of a multi-frequency mode.

In an embodiment, if the display panel DP shown in FIG. 4 includes the scan lines GI1 to GI3840, GC1 to GC3840, and GW1 to GW3841, the first display area DA1 may correspond to the scan lines GI1 to GI1920, GC1 to GC1920, and GW1 to GW1921, and the second display area DA2 may correspond to the scan lines GI1921 to GI3840, GC1921 to GC3840, and GW1921 to GW3841. That is, in FIG. 8A, 'j' may be a value between 1 and 1921. In FIG. 8B, 'j' may be a value between 1921 and 3840.

First of all, referring to FIGS. 8A and 9A, when the scan signal GIj having a high level is provided through the scan line GILj of the first display area DA1 in the first frame F1 of the multi-frequency mode MFM, the fourth transistor T4 is turned on. The first initialization voltage VINT1 is delivered to the gate electrode of the first transistor T1 through the fourth transistor T4 so as to initialize the first transistor T1.

Next, when the scan signal GCj having a high level is supplied through the scan line GCLj, the third transistor T3 is turned on. The first transistor T1 is diode-connected by the third transistor T3 turned on and is forward-biased.

At a first time t1 when the scan signal GWj having a low level is supplied through the scan line GWLj, the second transistor T2 is turned on. In the case, a compensation voltage, which is obtained by reducing the voltage (e.g., an image data voltage Vdata) of the data signal Di supplied through the data line DLi by a threshold voltage of the first transistor T1, is applied to the gate electrode of the first transistor T1. That is, a gate voltage applied to the gate electrode of the first transistor T1 may be a compensation voltage. At this time, the data signal Di supplied through the data line DLi may be an image data voltage Vdata to be provided to the light emitting diode ED.

As the first driving voltage ELVDD and the compensation voltage are applied to opposite two ends of the capacitor Cst, respectively, an electric charge corresponding to a difference between the first driving voltage ELVDD and the compensation voltage may be stored in the capacitor Cst.

Afterward, when the scan signal GWj+1 having a low level is provided through the scan line GWLj+1, the seventh transistor T7 is turned on. A part of the driving current Id may be drained through the seventh transistor T7 as the bypass current Ibp.

When the scan signal GWj having a low level (i.e., active level) is supplied through the scan line GWLj at a second time t2 after the scan signals GIj and GCj transition to low levels (i.e., inactive level), the second transistor T2 is turned on. In this case, the data signal Di supplied from the data line DLi is applied to the first electrode SE of the first transistor T1.

At a third time t3 when the scan signal GWj having a low level (i.e., active level) is supplied through the scan line GWLj again, the second transistor T2 is turned on. In this case, the data signal Di supplied from the data line DLi is applied to the first electrode SE of the first transistor T1.

The data signal Di supplied from the data line DLi at the first time t1 may be a signal provided to the pixel PXij of the j-th row shown in FIG. 4. The data signal Di supplied from the data line DLi at the second time t2 is a signal provided to the pixel PXij+a of the (j+a)-th row.

The data signal Di supplied from the data line DLi at the third time t3 may be a signal provided to the pixel PXij+b of the (j+b)-th row. Herein, each of 'a' and 'b' is a positive integer, and 'a' is smaller than 'b' (a<b). Each of 'a' and 'b' may vary depending on a time between the first time t1 and the second time t2 and a time between the second time t2 and the third time t3.

Afterward, when the light emitting control signal EMj supplied from the light emitting control line EMLj transitions to a low level (i.e., active level), the fifth transistor T5 and the sixth transistor T6 are turned on. In this case, the driving current Id is generated depending on a voltage difference between the gate voltage of the gate electrode of the first transistor T1 and the first driving voltage ELVDD and is supplied to the light emitting diode ED through the sixth transistor T6, and the light-emitting current Ied flows through the light emitting diode ED. At this time, the driving current Id supplied to the light emitting diode ED corresponds to the data signal Di supplied from the data line DLi at the first time t1.

The operation of the first display area DA1 in the second frame F2 of the multi-frequency mode MFM is the same as the operation of the first display area DA1 in the first frame F1.

That is, at a fourth time t4, when the scan signal GWj having a low level is supplied through the scan line GWLj at the first time in the second frame F2 of the multi-frequency mode MFM, the second transistor T2 is turned on. The data signal Di supplied through the data line DLi may be provided to one end of the capacitor Cst through the third transistor T3.

When the scan signal GWj having a low level is supplied through the scan line GWLj at a fifth time t5 after the scan signals GIj and GCj transition to low levels, the second transistor T2 is turned on. In this case, the data signal Di supplied from the data line DLi is applied to the first electrode SE of the first transistor T1.

At a sixth time t6 when the scan signal GWj having a low level is supplied through the scan line GWLj again, the second transistor T2 is turned on. In this case, the data signal Di supplied from the data line DLi is applied to the first electrode SE of the first transistor T1.

Afterward, when the light emitting control signal EMj supplied from the light emitting control line EMLj transitions to a low level, the fifth transistor T5 and the sixth transistor T6 are turned on. In this case, the driving current Id is generated depending on a voltage difference between the gate voltage of the gate electrode of the first transistor T1 and the first driving voltage ELVDD and is supplied to the light emitting diode ED through the sixth transistor T6, and the light-emitting current led flows through the light emitting diode ED. At this time, the driving current Id supplied to the light emitting diode ED corresponds to the data signal Di supplied from the data line DLi at the fourth time t4.

Referring to FIGS. 8B and 9A, the operation of the second display area DA2 in the first frame F1 of the multi-frequency mode MFM is the same as the operation of the first display area DA1 in the first frame F1 of the multi-frequency mode MFM.

That is, at the first time t1 when the scan signal GWj having a low level is supplied through the scan line GWLj, the second transistor T2 is turned on. The data signal Di supplied through the data line DLi may be provided to one end of the capacitor Cst through the third transistor T3.

When the scan signal GWj having a low level is supplied through the scan line GWLj at the second time t2 after the scan signals GIj and GCj transition to low levels, the second transistor T2 is turned on. In this case, the data signal Di supplied from the data line DLi is applied to the first electrode SE of the first transistor T1.

At the third time t3 when the scan signal GWj having a low level is supplied through the scan line GWLj again, the second transistor T2 is turned on. In this case, the data signal Di supplied from the data line DLi is applied to the first electrode SE of the first transistor T1.

Afterward, when the light emitting control signal EMj supplied from the light emitting control line EMLj transitions to a low level, the fifth transistor T5 and the sixth transistor T6 are turned on. In this case, the driving current Id is generated depending on a voltage difference between the gate voltage of the gate electrode of the first transistor T1 and the first driving voltage ELVDD and is supplied to the light emitting diode ED through the sixth transistor T6, and the light-emitting current Ied flows through the light emitting diode ED. At this time, the driving current Id supplied to the light emitting diode ED corresponds to the data signal Di supplied from the data line DLi at the first time t1.

Referring to FIGS. 8B and 9B, in the second frame F2 of the multi-frequency mode MFM, the scan signal GIj and the scan signal GCj corresponding to the second display area DA2 are maintained at a low level. While the scan signal GIj and the scan signal GCj are at low levels, the third transistor T3 and the fourth transistor T4 are turned off.

At the fourth time t4 when the scan signal GWj having a low level is supplied through the scan line GWLj at the first time in the second frame F2, the second transistor T2 is turned on. In this case, the data signal Di supplied through the data line DLi is provided to the first electrode SE of the first transistor T1. At this time, the data signal Di supplied through the data line DLi may be the bias voltage Vbias for initializing the first electrode SE of the first transistor T1. Under control of the driving controller 100, during the multi-frequency mode MFM, the data driving circuit 200 illustrated in FIG. 4 may set the data signal Di provided to the pixels PX in the second display area DA2 to the bias voltage Vbias (e.g., 6 volts (V)).

Afterward, when the scan signal GWj+1 having a low level is provided through the scan line GWLj+1, the seventh transistor T7 is turned on. A part of the driving current Id may be drained through the seventh transistor T7 as a bypass current Ibp.

At the fifth time t5 when the scan signal GWj having a low level is supplied through the scan line GWLj at the second time in the second frame F2, the second transistor T2 is turned on. In this case, the data signal Di supplied from the data line DLi is applied to the first electrode SE of the first transistor T1.

At the sixth time t6 when the scan signal GWj having a low level is supplied through the scan line GWLj again, the second transistor T2 is turned on. In this case, the data signal Di supplied from the data line DLi is applied to the first electrode SE of the first transistor T1.

The data signal Di supplied from the data line DLi at the fourth time t4, the fifth time t5, and the sixth time t6 is the bias voltage Vbias.

According to the hysteresis characteristic of the first transistor T1, the driving current Id of the first transistor T1 by the data signal Di of the current frame may be affected by the data signal Di applied in the previous frame.

When, in the multi-frequency mode MFM, the first display area DA1 is driven at the first operating frequency (e.g., 120 Hz) and the second display area DA2 is driven at the second operating frequency (e.g., 1 Hz), the luminance of each of the first display area DA1 and the second display area DA2 may vary depending on the hysteresis characteristic of the first transistor T1 in the pixel PX. In detail, when the second operating frequency of the second display area DA2 is a low frequency (e.g., 1 Hz), a period, during which the first transistor T1 in the pixel PX of the second display area DA2 is initialized, becomes longer. That is, the first transistor T1 in the pixel PX of the second display area DA2 is maintained in a specific state for a long time. In this case, a luminance according to the hysteresis characteristic of the first transistor T1 in the pixel PX of the second display area DA2 may be changed.

In an embodiment, not only in the first frame F1 but also in the second frame F2 of the multi-frequency mode MFM, each of the scan signals GWj and GWj+1 may transition to an active level (e.g., a low level). The i-th data line DLi may provide the bias voltage Vbias to the first electrode SE of the first transistor T1. When the bias voltage Vbias is provided to the first electrode SE of the first transistor T1 during the second frame F2, the first transistor T1 may be in an on-bias state. In detail, a change in luminance of the second display area DA2 may be effectively minimized by providing the bias voltage Vbias to the first electrode SE of the first transistor T1 in the second display area DA2 in the second frame F2 two or more times (e.g., three times in the embodiment of FIGS. 8A and 8B).

The number of times (i.e., a toggling count) that the scan signal GWj transitions to the active level within one frame may be set depending on the characteristics of the display panel DP.

In an embodiment, the number of times that the scan signal GWj transitions to the active level within one frame may be changed depending on duration of the multi-frequency mode MFM. In an embodiment, in the case where the toggling count of the scan signal GWj is set to 'k' ('k' is a positive integer) at an initial time, if the duration of the multi-frequency mode MFM is greater than a reference time, the toggling count of the scan signal GWj may be changed into 'k+1'.

Figure 10:
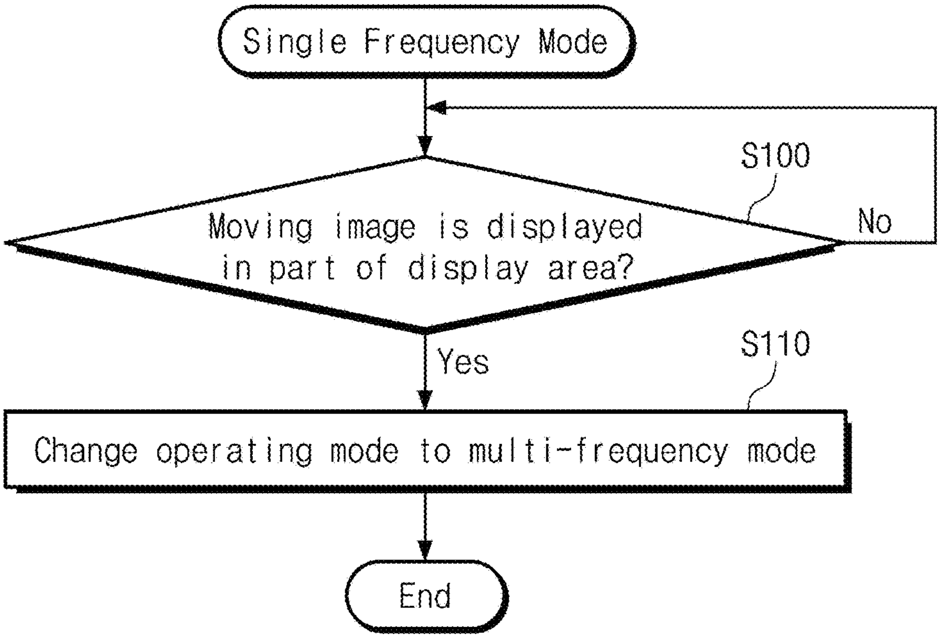
FIG. 10 is a flowchart illustrating an operation of a driving controller, according to an embodiment of the present disclosure.

FIG. 10 is a flowchart illustrating an operation of a driving controller, according to an embodiment of the present disclosure.

Referring to FIGS. 4 and 10, at an initial time (e.g., after power-up), an operating mode of the driving controller 100 may be set to a single frequency mode NFM.

The driving controller 100 determines a frequency mode in response to the image signal RGB and the control signal CTRL. For example, when a part (e.g., an image signal corresponding to the first display area DA1 (refer to FIG. 1)) of the image signal RGB within one frame are a moving image and another part (e.g., an image signal corresponding to the second display area DA2 (refer to FIG. 1)) of the image signal is a still image (in operation S100), the driving controller 100 changes an operating mode to a multi-frequency mode (in operating S110).

Figure 11:
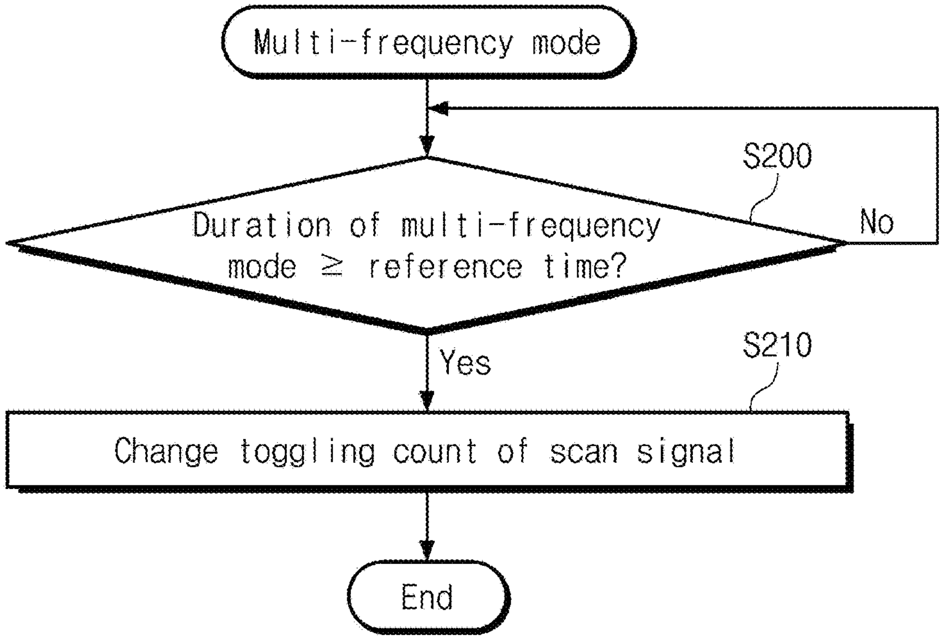
FIG. 11 is a flowchart illustrating an operation of a driving controller in a multi-frequency mode, according to an embodiment of the present disclosure.

FIG. 11 is a flowchart illustrating an operation of a driving controller in a multi-frequency mode, according to an embodiment of the present disclosure.

Referring to FIGS. 4 and 11, during a multi-frequency mode MFM, the first display area DA1 may be driven at a first operating frequency, and the second display area DA2 may be driven at a second operating frequency lower than the first operating frequency.

The driving controller 100 may count duration of the multi-frequency mode MFM.

When the duration of the multi-frequency mode MFM is greater than or equal to a reference time (in operation S200), the driving controller 100 changes the toggling count of each of the scan signals GW1 to GWn+1 (in operation S210).

The toggling count of each of the scan signals GW1 to GWn+1 means the number of times that the scan signals GW1 to GWn+1 each transition to an active level (e.g., a low level) in each frame during the multi-frequency mode MFM.

In an embodiment, when the toggling count of each of the scan signals GW1 to GWn+1 has been two times at an initial time, in operation S210, the toggling count of each of the scan signals GW1 to GWn+1 may be changed into three times if the duration of the multi-frequency mode MFM is greater than or equal to the reference time.

In an embodiment, when the toggling count of each of the scan signals GW1 to GWn+1 has been three times at an initial time, in operation S210, the toggling count of each of the scan signals GW1 to GWn+1 may be changed into four times if the duration of the multi-frequency mode MFM is greater than or equal to the reference time.

When the toggling count of each of the scan signals GW1 to GWn+1 increases, the number of times that the bias voltage Vbias is provided to the first electrode SE of the first transistor T1 (refer to FIG. 5) in each frame increases. Accordingly, a change in luminance of the second display area DA2 may be effectively minimized as the duration of the multi-frequency mode MFM increases.

Figure 12:
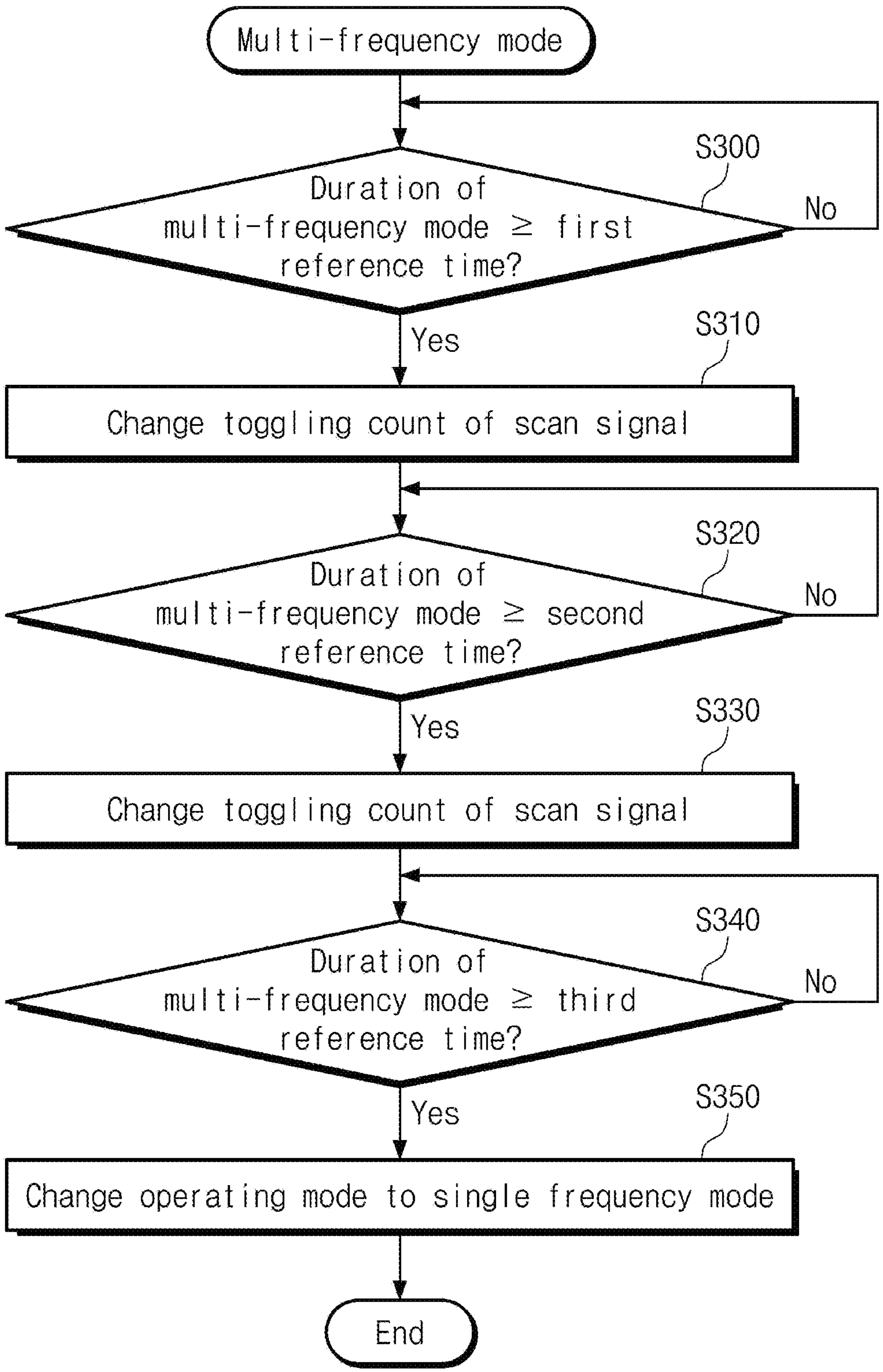
FIG. 12 is a flowchart illustrating an operation of a driving controller in a multi-frequency mode, according to another embodiment of the present disclosure.

FIG. 12 is a flowchart illustrating an operation of a driving controller in a multi-frequency mode, according to another embodiment of the present disclosure.

Referring to FIGS. 4 and 12, during a multi-frequency mode MFM, the first display area DA1 may be driven at a first operating frequency, and the second display area DA2 may be driven at a second operating frequency lower than the first operating frequency.

The driving controller 100 may count duration of the multi-frequency mode MFM.

When the duration of the multi-frequency mode MFM is greater than or equal to a first reference time (in operation S300), the driving controller 100 changes the toggling count of each of the scan signals GW1 to GWn+1 (in operation S310).

The toggling count of each of the scan signals GW1 to GWn+1 means the number of times that the scan signals GW1 to GWn+1 transition to an active level (e.g., a low level) in each frame during the multi-frequency mode MFM.

In an embodiment, when the toggling count of each of the scan signals GW1 to GWn+1 has been two times at an initial time, in operation S310, the toggling count of each of the scan signals GW1 to GWn+1 may be changed into three times.

Afterward, when the duration of the multi-frequency mode MFM is greater than or equal to a second reference time (in operation S320), the driving controller 100 changes the toggling count of each of the scan signals GW1 to GWn+1 (in operation S330).

In an embodiment, when the toggling count has been three times in operation S310, in operation S330, the toggling count of each of the scan signals GW1 to GWn+1 may be changed into four times.

Afterward, when the duration of the multi-frequency mode MFM is greater than or equal to a third reference time (in operation S340), the driving controller 100 changes an operating mode to a single frequency mode (in operation S350).

As shown in FIGS. 8A and 8B, the scan signals GW1 to GWn+1 may be toggled until the light emitting control signal EMj transitions to an active level (e.g., a low level) after the scan signal GCj transitions to an inactive level (e.g., a low level). That is, the toggling count of each of the scan signals GW1 to GWn+1 may not increase unlimitedly.

Accordingly, when the duration of the multi-frequency mode MFM is greater than the third reference time, the difference in luminance between the first display area DA1 and the second display area DA2 may be reduced by changing an operating mode to a single frequency mode NFM.

Although described above with reference to a preferred embodiment of the present disclosure, it will be understood by those skilled in the art that various modifications and changes can be made in the present disclosure without departing from the spirit and scope of the present disclosure as set forth in the claims below. Accordingly, the technical scope of the present disclosure should not be limited to the contents described in the detailed description of the specification, but should be defined by the claims.

A display device having such a configuration may operate in a multi-frequency mode in which a first display area is driven at a first operating frequency and a second display area is driven at a second operating frequency. Accordingly, power consumption of the display device may be reduced. A luminance difference between the first display area and the second display area may be prevented from being visually perceived, by compensating for the characteristic change of pixels in the second display area in the multi-frequency mode. Accordingly, the power consumption of the display device may be reduced and display quality may be prevented from being deteriorated.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:
a display panel including a pixel;
a data driving circuit which drives a data line;
a scan driving circuit which drives a first scan line and a second scan line; and
a driving controller which controls the data driving circuit and the scan driving circuit,
wherein the pixel includes:
a first transistor including a first electrode, a second electrode, and a gate electrode;

a second transistor including a first electrode connected to the data line, a second electrode electrically connected to the first electrode of the first transistor, and a gate electrode connected to the second scan line; and a third transistor including a first electrode connected to the second electrode of the first transistor, a second electrode, and a gate electrode connected to the first scan line, wherein a second scan signal provided to the second scan line transitions to an active level at least twice in each of a first frame and a second frame, and a first scan signal provided to the first scan line is maintained at an inactive level in the second frame.

2. The display device of claim 1, wherein the data driving circuit provides a data signal to the data line, during the first frame.

3. The display device of claim 2, wherein, the second transistor transmits the data signal of the data line to the first electrode of the first transistor in response to the second scan signal, during the first frame.

4. The display device of claim 1, wherein the data driving circuit provides a bias signal to the data line, during the second frame.

5. The display device of claim 4, wherein, the second transistor transmits the bias signal of the data line to the first electrode of the first transistor in response to the second scan signal, during the second frame.

6. The display device of claim 1, wherein each of the first transistor and the second transistor is a PMOS transistor, and wherein the third transistor is an NMOS transistor.

7. The display device of claim 1, wherein the pixel further includes:

a capacitor connected between a first driving voltage line and the gate electrode of the first transistor;

a fifth transistor including a first electrode connected to the first driving voltage line, a second electrode electrically connected to the first electrode of the first transistor, and a gate electrode connected to a light emitting control line;

a sixth transistor including a first electrode connected to the second electrode of the first transistor, a second electrode and a gate electrode connected to the light emitting control line; and a light emitting diode including an anode connected to the second electrode of the sixth transistor and a cathode connected to a second driving voltage line.

8. The display device of claim 7, wherein the pixel further includes:

a fourth transistor including a first electrode connected to the gate electrode of the first transistor, a second electrode connected to a third driving voltage line, and a gate electrode connected to a third scan line; and a seventh transistor including a first electrode connected to a fourth driving voltage line, a second electrode connected to the second electrode of the sixth transistor, and a gate electrode connected to a fourth scan line.

9. An electronic device comprising:

a display panel including a pixel;

a data driving circuit which drives a data line;

a scan driving circuit which drives a first scan line and a second scan line; and a driving controller which controls the data driving circuit and the scan driving circuit, wherein the pixel includes:

a first transistor including a first electrode, a second electrode, and a gate electrode;

a second transistor including a first electrode connected to the data line, a second electrode electrically connected to the first electrode of the first transistor, and a gate electrode connected to the second scan line; and a third transistor including a first electrode connected to the second electrode of the first transistor, a second electrode, and a gate electrode connected to the first scan line, wherein the second transistor is turned at least twice in each of a first frame and a second frame by receiving a toggling scan signal through the second scan line, wherein, during the first frame, the data driving circuit provides a data signal to the data line and the second transistor transmits the data signal of the data line to the first electrode of the first transistor, and wherein, during the second frame, a first scan signal provided to the first scan line is maintained at an inactive level and the data driving circuit provides a bias signal to the data line and the second transistor transmits the bias signal of the data line to the first electrode of the first transistor.

10. The electronic device of claim 9, wherein a first scan signal provided to the first scan line transitions to an active level at least once in the first frame.

11. The electronic device of claim 9, wherein each of the first transistor and the second transistor is a PMOS transistor, and wherein the third transistor is an NMOS transistor.

12. The electronic device of claim 9, wherein the pixel further includes:

a capacitor connected between a first driving voltage line and the gate electrode of the first transistor;

a fifth transistor including a first electrode connected to the first driving voltage line, a second electrode electrically connected to the first electrode of the first transistor, and a gate electrode connected to a light emitting control line;

a sixth transistor including a first electrode connected to the second electrode of the first transistor, a second electrode and a gate electrode connected to the light emitting control line; and a light emitting diode including an anode connected to the second electrode of the sixth transistor and a cathode connected to a second driving voltage line.

13. The electronic device of claim 12, wherein the pixel further includes:

a fourth transistor including a first electrode connected to the gate electrode of the first transistor, a second electrode connected to a third driving voltage line, and a gate electrode connected to a third scan line; and a seventh transistor including a first electrode connected to a fourth driving voltage line, a second electrode connected to the second electrode of the sixth transistor, and a gate electrode connected to a fourth scan line.

14. A method for driving a display device including a display panel, the method comprising:

maintaining a signal level of a first scan signal provided to first scan line at an inactive level during a multi-frequency mode;

toggling a second scan signal provided to a second scan line at least twice per a frame during a multi-frequency mode;

determining whether duration of the multi-frequency mode is greater than or equal to a first reference time; and based on determining that the duration of the multi-frequency mode is greater than or equal to the first reference time, changing a toggling count of the second scan signal per the frame, wherein the display panel includes a pixel, and wherein the pixel includes:

a first transistor including a first electrode, a second electrode, and a gate electrode;

a second transistor including a first electrode connected to a data line, a second electrode electrically connected to the first electrode of the first transistor, and a gate electrode connected to the second scan line; and a third transistor including a first electrode connected to the second electrode of the first transistor, a second electrode, and a gate electrode connected to the first scan line.

15. The method of claim 14, further comprising:

based on determination that the duration of the multi-frequency mode is greater than or equal to the first reference time, incrementing the toggling count of the second scan signal per the frame.

16. The method of claim 15, further comprising:

based on determination that the duration of the multi-frequency mode is greater than or equal to a second reference time, incrementing the toggling count of the second scan signal per the frame, wherein the second reference time is greater than the first reference time.

17. The method of claim 16, wherein a bias signal is provided to the data line, during maintaining a signal level of a first scan signal at an inactive level.

18. The method of claim 17, wherein, the second transistor transmits the bias signal of the data line to the first electrode of the first transistor in response to the second scan signal.

* * * * *